United States Patent
Ash et al.

(10) Patent No.: US 11,009,262 B2
(45) Date of Patent: May 18, 2021

(54) TILE ROOF MOUNT

(71) Applicant: Ironridge, Inc., Hayward, CA (US)

(72) Inventors: Jon Ash, Phoenix, AZ (US); Shawn Meine, Phoenix, AZ (US); Anumeha Narain, Paradise Valley, AZ (US); Clayton Rietz, Phoenix, AZ (US); David Taggart, San Carlos, CA (US)

(73) Assignee: Ironridge, Inc., Hayward, CA (US)

( * ) Notice: Subject to any disclaimer, the term of this patent is extended or adjusted under 35 U.S.C. 154(b) by 0 days.

(21) Appl. No.: 16/842,687

(22) Filed: Apr. 7, 2020

(65) Prior Publication Data

US 2020/0232681 A1    Jul. 23, 2020

Related U.S. Application Data

(63) Continuation of application No. 15/550,016, filed as application No. PCT/US2016/044754 on Jul. 29, 2016, now Pat. No. 10,663,195.

(60) Provisional application No. 62/251,530, filed on Nov. 5, 2015, provisional application No. 62/198,651, filed on Jul. 29, 2015.

(51) Int. Cl.
| | |
|---|---|
| *F24S 25/613* | (2018.01) |
| *H02S 20/25* | (2014.01) |
| *H02S 20/24* | (2014.01) |
| *H02S 20/23* | (2014.01) |
| *H02S 20/22* | (2014.01) |
| *F24S 25/61* | (2018.01) |
| *F24S 25/70* | (2018.01) |

(52) U.S. Cl.
CPC ............ *F24S 25/613* (2018.05); *F24S 25/61* (2018.05); *F24S 25/70* (2018.05); *H02S 20/22* (2014.12); *H02S 20/23* (2014.12); *H02S 20/24* (2014.12); *H02S 20/25* (2014.12); *Y02B 10/10* (2013.01); *Y02B 10/20* (2013.01); *Y02E 10/47* (2013.01)

(58) Field of Classification Search
CPC ....................................................... H02S 20/25
USPC .... 248/237, 220.21, 221.11, 222.11, 222.12, 248/223.41, 224.8, 225.11, 48.1
See application file for complete search history.

(56) References Cited

U.S. PATENT DOCUMENTS

| | | | |
|---|---|---|---|
| 6,146,071 A | 11/2000 | Norkus et al. | |
| 6,584,737 B1 * | 7/2003 | Bradley, Jr. | ........... F24S 25/632 52/173.3 |
| 7,246,547 B2 | 7/2007 | Van Walraven | |

(Continued)

FOREIGN PATENT DOCUMENTS

| | | |
|---|---|---|
| DE | 202009003745 U1 | 8/2009 |
| DE | 2020141010153 U1 | 6/2014 |

(Continued)

*Primary Examiner* — Terrell L McKinnon
*Assistant Examiner* — Michael McDuffie
(74) *Attorney, Agent, or Firm* — Lance C. Venable; Law Office of Lance C. Venable, PLLC

(57) ABSTRACT

In various representative aspects, an assembly for securing a solar panel rail support structure to a tile roof. More specifically, the apparatus includes a base plate that is secured to the roof beneath various shapes of tiles on the tile roof and a generally L-shaped bracket that is then coupled to a rail support guide. The bracket is then capable of being adjusted in various locations along the base plate by using screws in various locations along slotted apertures within the base.

2 Claims, 22 Drawing Sheets

(56) References Cited

U.S. PATENT DOCUMENTS

| | | | |
|---|---|---|---|
| 8,647,009 B2* | 2/2014 | Kobayashi | F24S 25/61 403/7 |
| 8,752,338 B2* | 6/2014 | Schaefer | F24S 25/70 52/60 |
| 8,806,815 B1 | 8/2014 | Liu et al. | |
| 8,839,575 B1 | 9/2014 | Liu et al. | |
| 8,844,887 B2* | 9/2014 | Genschorek | B30B 3/04 248/220.22 |
| 9,151,519 B2* | 10/2015 | Esken | F16M 13/02 |
| 9,397,607 B2* | 7/2016 | Atchley | H02S 20/23 |
| 9,954,479 B1* | 4/2018 | Atia | H02S 20/24 |
| 10,236,821 B1* | 3/2019 | Atia | H02S 20/23 |
| 10,277,162 B1* | 4/2019 | Atia | H02S 20/23 |
| 10,320,325 B1* | 6/2019 | Atia | H02S 20/23 |
| 10,663,195 B2* | 5/2020 | Ash | H02S 20/25 |
| 2004/0216399 A1 | 11/2004 | Yamada | |
| 2006/0156648 A1 | 7/2006 | Thompson | |
| 2011/0248131 A1 | 11/2011 | Genschorek | |
| 2012/0275844 A1 | 11/2012 | Koayashi | |
| 2013/0161462 A1* | 6/2013 | Haddock | F16B 5/06 248/237 |
| 2013/0206941 A1 | 8/2013 | Esken | |
| 2014/0003861 A1 | 1/2014 | Cheung et al. | |
| 2014/0026946 A1 | 1/2014 | West et al. | |
| 2015/0060619 A1 | 3/2015 | Krannich et al. | |
| 2015/0135608 A1* | 5/2015 | Shibata | F24S 25/615 52/126.1 |
| 2015/0247326 A1* | 9/2015 | Haddock | F24S 25/636 52/705 |
| 2016/0006390 A1* | 1/2016 | Cinnamon | F24S 25/61 248/237 |
| 2016/0054030 A1* | 2/2016 | Ilzhofer | F24S 25/33 248/237 |
| 2016/0087576 A1* | 3/2016 | Johansen | H02S 20/25 52/58 |
| 2016/0105143 A1* | 4/2016 | Johansen | H02S 20/23 248/237 |
| 2016/0134230 A1* | 5/2016 | Meine | F24S 25/61 52/698 |
| 2016/0308486 A1* | 10/2016 | Atia | F24S 25/636 |
| 2017/0063287 A1* | 3/2017 | Hudson | F24S 25/61 |
| 2018/0062571 A1* | 3/2018 | Ash | F16B 39/32 |
| 2018/0106289 A1* | 4/2018 | Ash | F16B 39/284 |
| 2018/0167020 A1* | 6/2018 | Truthseeker | H02S 30/00 |
| 2019/0131917 A1* | 5/2019 | Tomolillo | H02S 30/00 |
| 2019/0345971 A1* | 11/2019 | Ash | F24S 25/615 |

FOREIGN PATENT DOCUMENTS

| | | |
|---|---|---|
| EP | 1764454 A2 | 3/2007 |
| EP | 2474796 A1 | 12/2011 |
| EP | 2527762 A1 | 11/2012 |

* cited by examiner

TILE ROOF MOUNT

BACKGROUND OF INVENTION

Field of the Invention

The present invention relates generally to an apparatus for securing a solar panel rail support structure to a tile roof. By employing the apparatus at various locations along the tile roof in a linear fashion, the rail support structure can be properly installed on the roof and enable an array of solar panel modules to be installed. A method of installation is also disclosed.

Description of the Related Art

Any discussion of the prior art in the specification should in no way be considered as an admission that the prior art is widely known or forms part of common general knowledge in the field.

The installation of solar panel arrays on residential roofs can be arduous and time-consuming. Depending on the array design, the components required to install the array can make the installation process even more difficult. Many of the assembly components require special tools or are generally difficult to install because they are utilized after the solar panels modules are arranged or positioned on their support elements. This is particularly true when the elements must be installed on a tile roof that links to a rail guide for supporting the solar panel array. The curvature of some roof tiles makes it particularly difficult install a rail-guide system in a manner that provides the necessary support for the solar panel array, gives the installer flexibility to adjust the location of the support mechanism, and minimizes the profile of the support structure, which may negatively affect the aesthetics and structural capacity of the array. In particular, it is often difficult to precisely adjust the location and orientation of the support mechanism to a desired location due to the variability in tile and roofing structure shapes, sizes, and spacing. Therefore, it is desirable to provide a simple, adjustable support structure that can be properly oriented and installed beneath a wide range of tiles in a manner that maintains the integrity of the tile roof and hides the structure from plain view.

In a typical support rail guide system that is installed on tile roofs, the tiles are normally removed in the area where the support mechanism will be installed. Generally, a support mechanism includes a base and a curved bracket that is coupled to the base. The base is then secured to the roof, and the tiles are reassembled so that the curved bracket fits between the tiles and a rail guide can be secured to the end of the bracket.

Existing solutions are typically limited by their inability to easily and precisely adjust the location of the curved arm and the extra time, steps, and tools needed to secure any adjustability. One example of this is shown in US Patent Application US 2013/0206941 and U.S. Pat. Nos. 8,806, 815, 8,839,575, and 8,844,887. Each of these references teach a support mechanism with a base that is secured to a roof and a curved arm coupled to the base that can be secured to a rail support guide. But in each of these references, the curved arm is secured to the base using a standard bolt that may also include a nut at different lateral locations along the base. The use of the nut and bolt to secure the curved arm is not only cumbersome, but it requires additional time and tools.

The present invention overcomes these limitations and offers a solution that provides support mechanism for tiled roofs that is both easy to, install, use, and manufacture, which allows the mechanism to be easily and precisely adjusted laterally along the base of the support mechanism.

SUMMARY OF THE INVENTION

The invention is summarized below only for purposes of introducing embodiments of the invention. The ultimate scope of the invention is to be limited only to the claims that follow the specification.

It is an object of this invention to provide an apparatus for securing a solar panel rail guide structure to a tile roof.

It is a further object of this invention that the apparatus has a base that is secured to the roof.

It is a further object of this invention that the apparatus comprises an elongated member that is coupled to a guide on the base at one end of the elongated bracket.

It is a further object of this invention that another end of the elongated member can be coupled to the rail guide for supporting an array of solar panel modules.

It is a further object of the invention that the base can be installed in either a north or south-facing direction relative to the horizontal direction of the roof.

It is a further object of the invention that the end of the elongated member is coupled to the guide of the base with a locking mechanism that enables an installer to move the elongated member laterally into a desired position.

It is a further object of the invention that the locking mechanism comprise a spring lock latch that allows an installer to laterally move the elongated member into position when the latch is actuated.

It is a further object of the invention that the elongated member can be locked to the guide when the spring lock latch is released.

It is a further object of the invention that the spring lock latch eliminates the need to secure the elongated member to the base with a fastener.

It is a further object of the invention for the elongated member to have an aperture on the end opposite the spring lock latch for connecting to the rail support guide.

It is a further object of the invention to have a textured surface surrounding the aperture for providing traction between the rail support guide and the end of the elongated member.

It is a further object of this invention to provide a recessed path or slot on at least one side of the aperture that prevents the nut from sliding out of the aperture.

It is a further object of this invention to provide a method of assembling the apparatus utilizing the steps described below.

A person with ordinary skill in the relevant art would know that any shape or size of the elements described below may be adopted. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

DETAILED DESCRIPTION OF THE INVENTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 11:
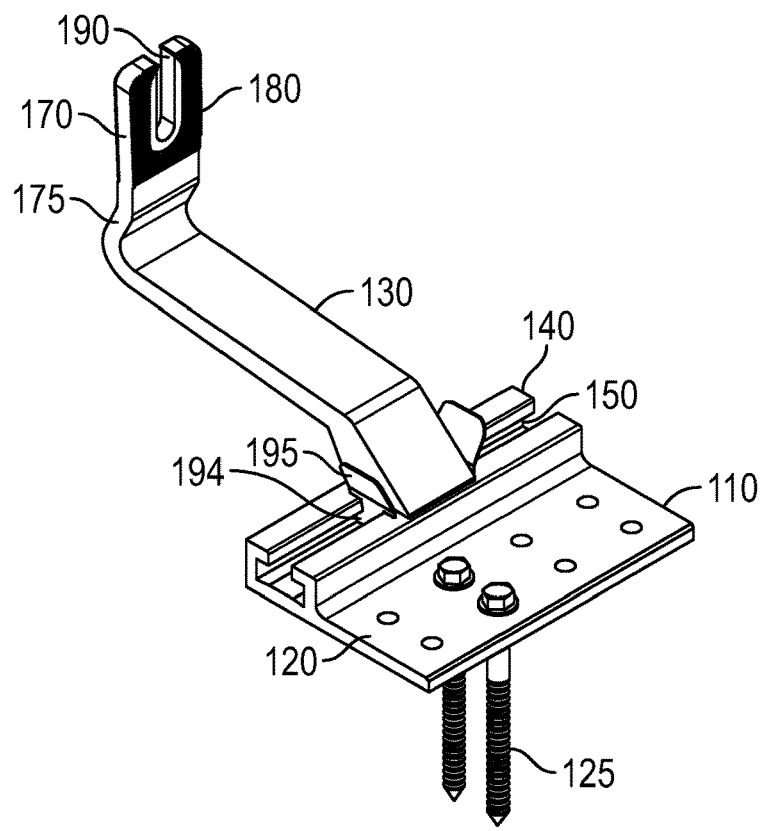
FIG. 11 illustrates a perspective view of another exemplary embodiment of the apparatus that utilizes the locking mechanism, which comprises a pair of spring lock or resilient tabs to secure the elongated member to the base.
Figure 12:
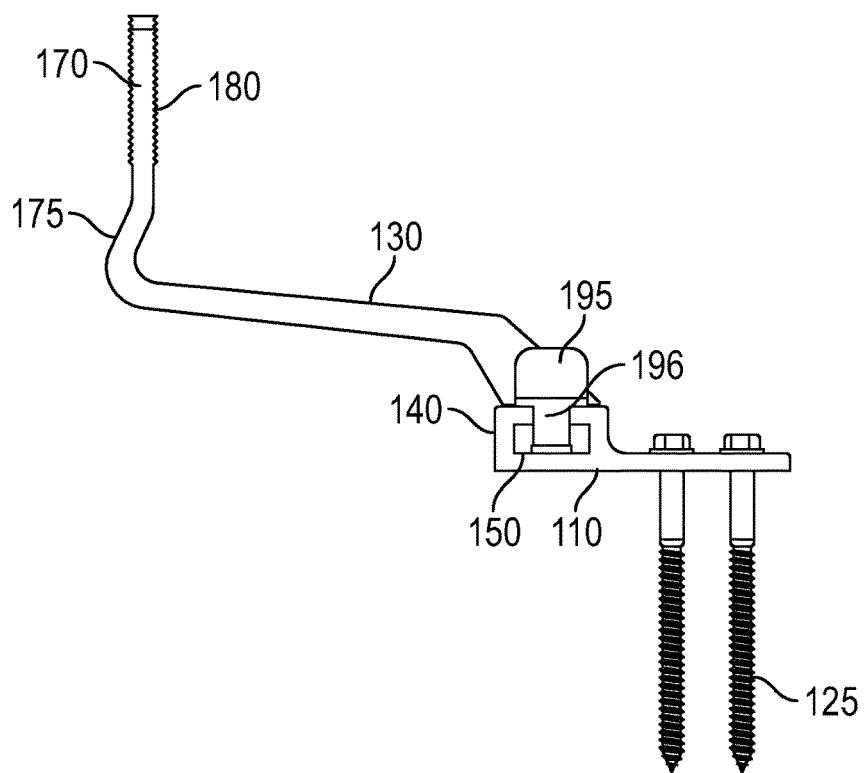
FIG. 12 illustrates a side view of the embodiment shown in FIG. 11.
Figure 13:
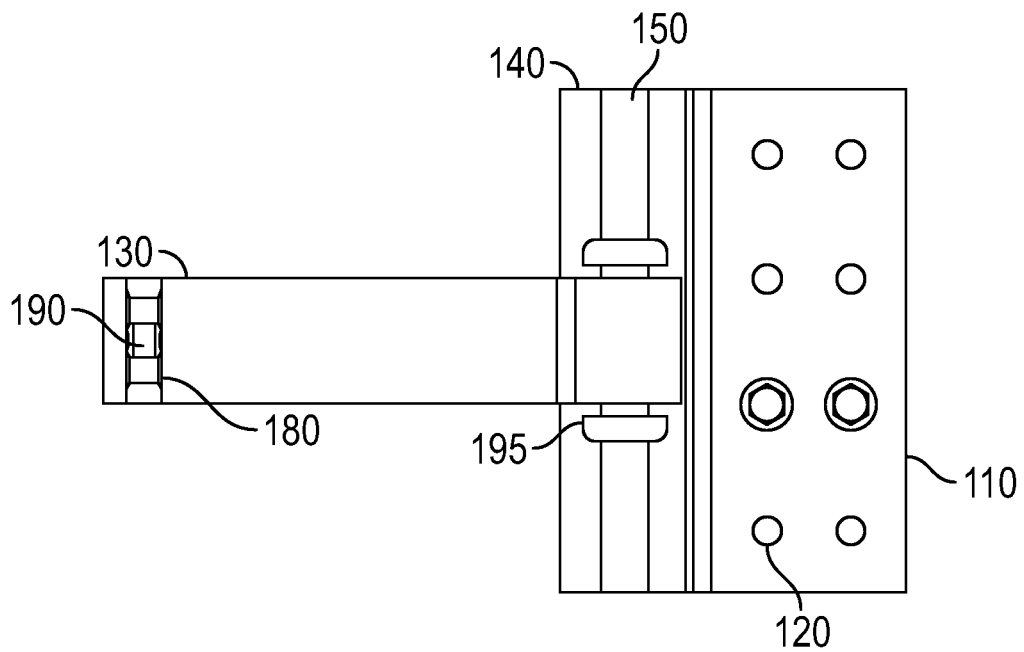
FIG. 13 illustrates a top view of the embodiment shown in FIG. 11.

FIGS. 11-13 shows perspective, side, and top views of an exemplary embodiment of a solar panel support structure 100. The structure 100 includes a base 110. The base or base plate 110 is generally planar but can be other shapes so long as it can fit beneath a typical roof tile 300. The base plate 110 typically includes holes 120 on one side for receiving screws 125 for securing the base plate 110 to a roof. The other side of the base plate 110 also includes a guide that can be in the form of a slot guide 150 that is formed by a pair of rails 140 that are parallel to each other on opposite sides of the slot guide 150. The slot guide 150 is generally open on both ends so that it can receive the locking mechanism 196 discussed below.

Figure 12A:
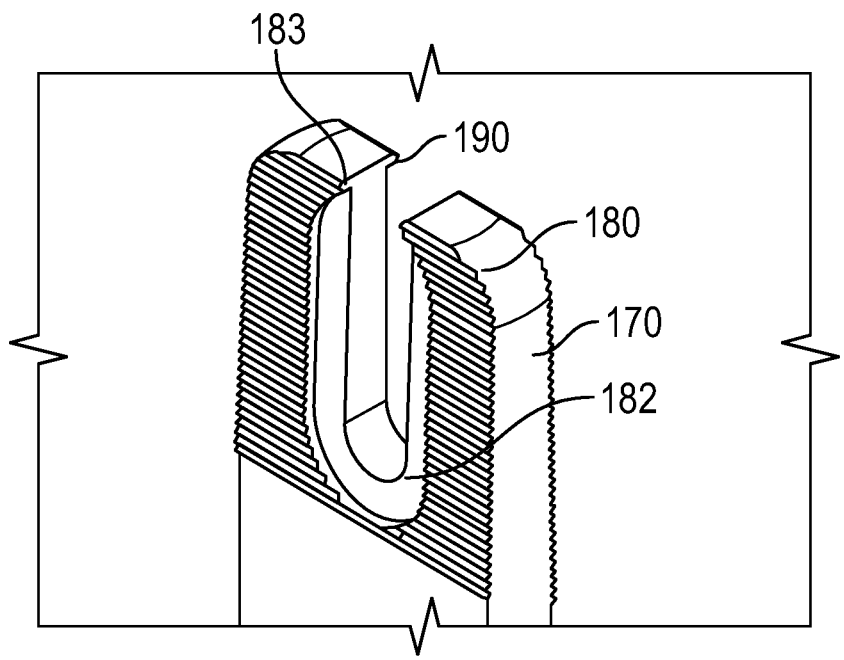
FIG. 12A illustrates a close-up perspective view of the aperture on the elongated member.
Figure 12B:
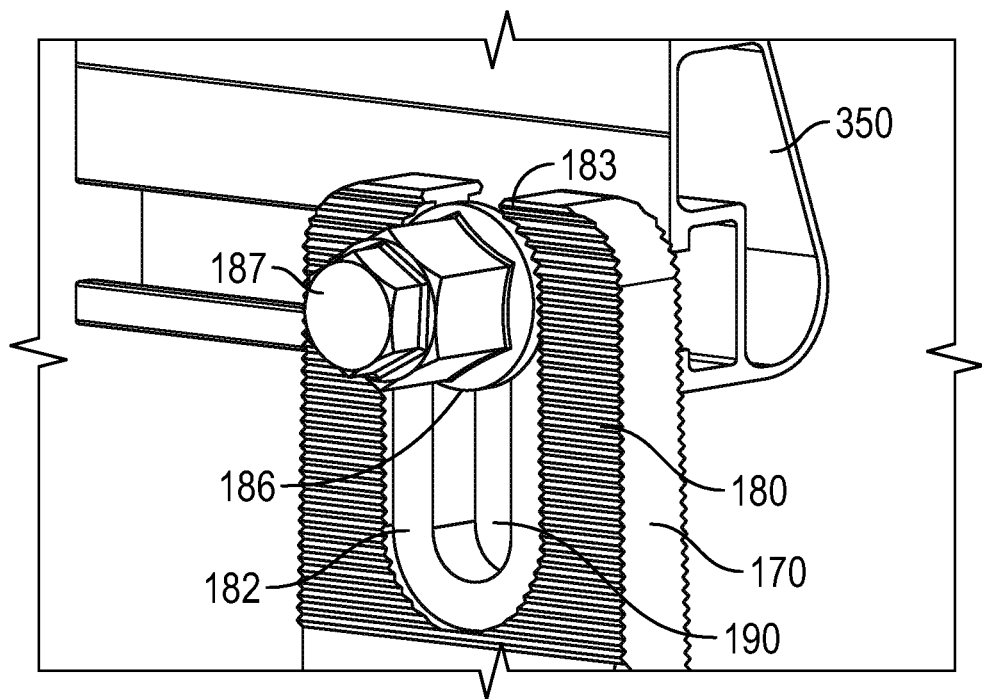
FIG. 12B illustrates a close-up perspective view of the aperture on the elongated member coupled to an exemplary solar panel rail guide.

The structure 100 also includes an elongated member that is typically a bracket 130. The bracket 130 is typically curved in the shape of an "L" or an "S" and has a sufficient length so that it can conform to the shape of a typical roof tile. On one end of the bracket 130 is a generally U-shaped aperture 170 that includes opening 190. The shape of the aperture 170 is not limited to one that has an opening 190, but can also utilize a closed shape as well like the one shown in FIG. 1. The aperture 170 generally is perpendicular to the base plate 110 so that when it subsequently receives a solar panel rail guide (350 in FIG. 4), the rail guide 350 will also be substantially perpendicular to the plane of the roof. FIG. 12A illustrates a close up of the aperture 170. The surface of the U-shaped aperture 170 includes a plurality of grooves 180 that provide friction to prevent the rail guide 350 from slipping up or down the aperture 170. Aperture 170 also includes a recessed path 182 that terminates at a lip 183. FIG. 12B shows how once a fastener such as nut and bolt 187 is dropped into the opening 190, the path 182 allows the nut and bolt 187 to move along the path 182, but the lip 183 prevents the edge of the bolt 186 from slipping out of the opening 190. The recessed path 182 on both sides of the bracket 130 allows the fasteners 187 and rail guide 350 to be installed on either side of the bracket 130. The end opposite the aperture 170 on the bracket 130 includes a locking mechanism 196 that is inserted in either end of the slot guide 150. The locking mechanism 196 in this exemplary embodiment comprises a pair of tabs 195 that may be spring-loaded or resilient tabs that, when actuated—in this case by squeezing together—the tabs 195 are raised above the upper surface of the rails 140 so that the bracket 130 can freely move laterally back and forth along the slot guide 150 while in an open position to a desired location. The open position in this embodiment typically means when at least one of the tabs 195 is being actuated. A single resilient tab 195 could be used, but a pair of resilient tabs 195 provides greater leverage when actuating the locking mechanism 196. When the tabs 195 are released to their normal default position, the tabs 195 are lowered on to the rails 140 and create substantial friction so that the locking mechanism 196 will lock and place the bracket 130, which is typically referred to as a closed position along the guide 150.

Figure 14:
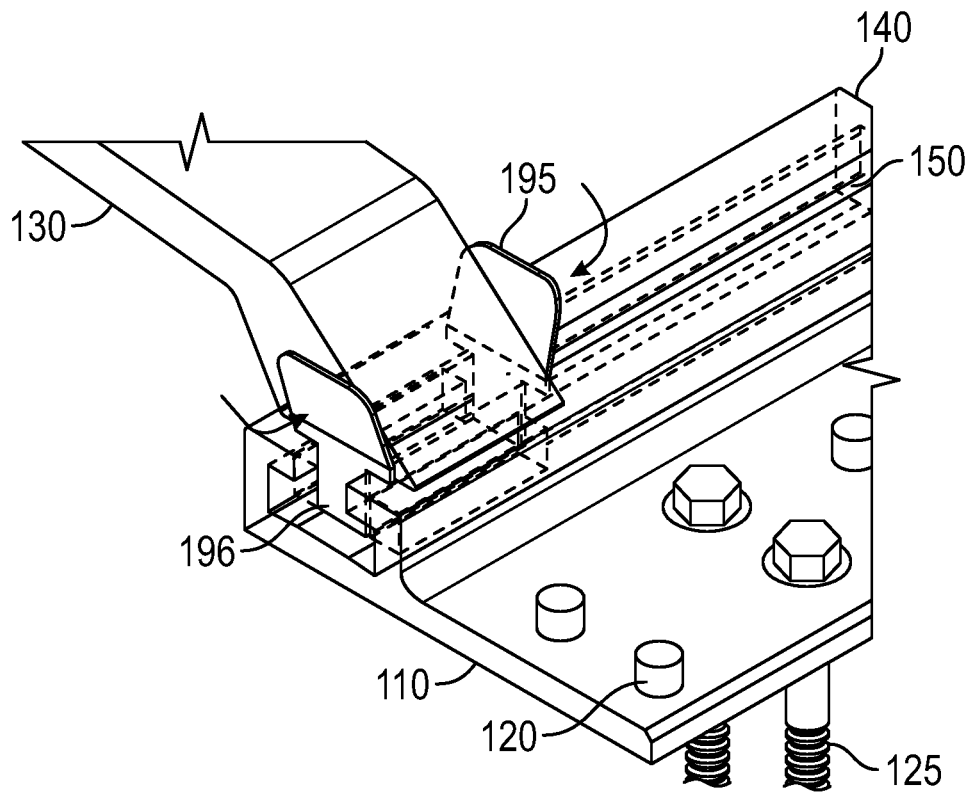
FIG. 14 illustrates the transparent perspective view of the spring lock tabs in the unlocked (actuated) position of the embodiment shown in FIG. 11.
Figure 15:
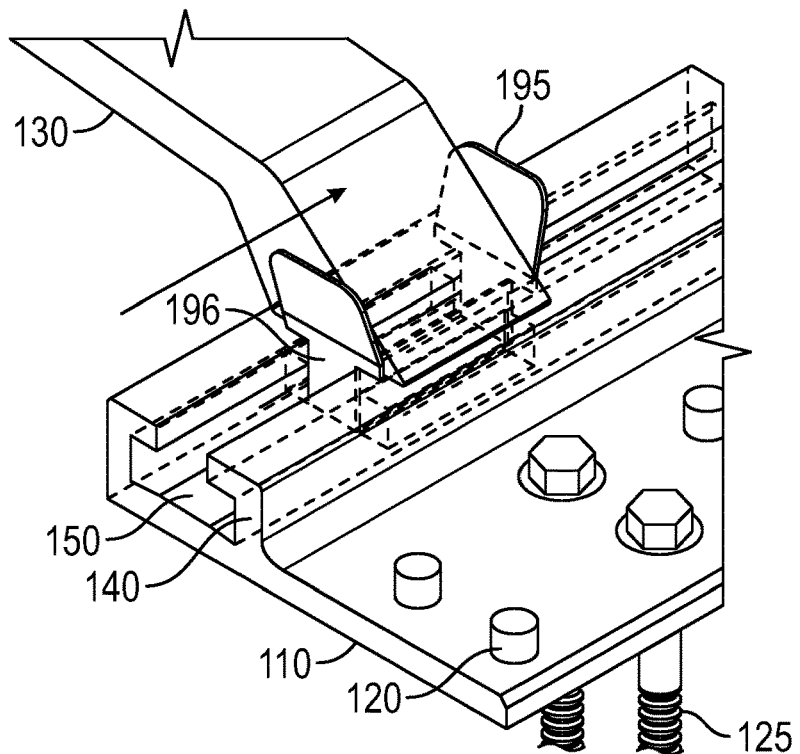
FIG. 15 illustrates the same view shown in FIG. 14 with the elongated member being moved to a new location along the guide while in the unlocked (actuated) position.
Figure 16:
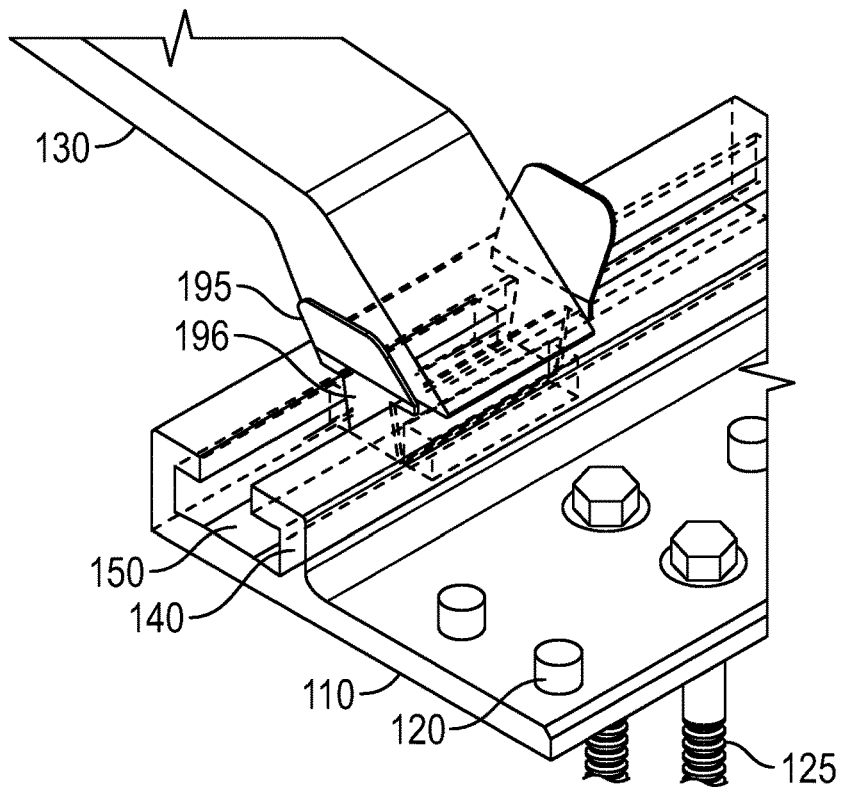
FIG. 16 illustrates the same view shown in FIG. 15 with the spring lock tabs in the locked (default) position.

FIGS. 14-16 provide a transparent view of the guide during the progression of moving the bracket 130 from left to right in the slot guide 150. FIG. 14 shows the grips 195 squeezed toward the middle, which raises the tabs 195 above the rails 140. FIG. 15 shows the bracket 130 move toward the right while the tabs 195 are squeezed together, and FIG. 16 shows the tabs 195 released to their default position so that the tabs 195 are lowered back on to the rails 140 thereby securing the bracket 130 in a locked position.

Figure 17:
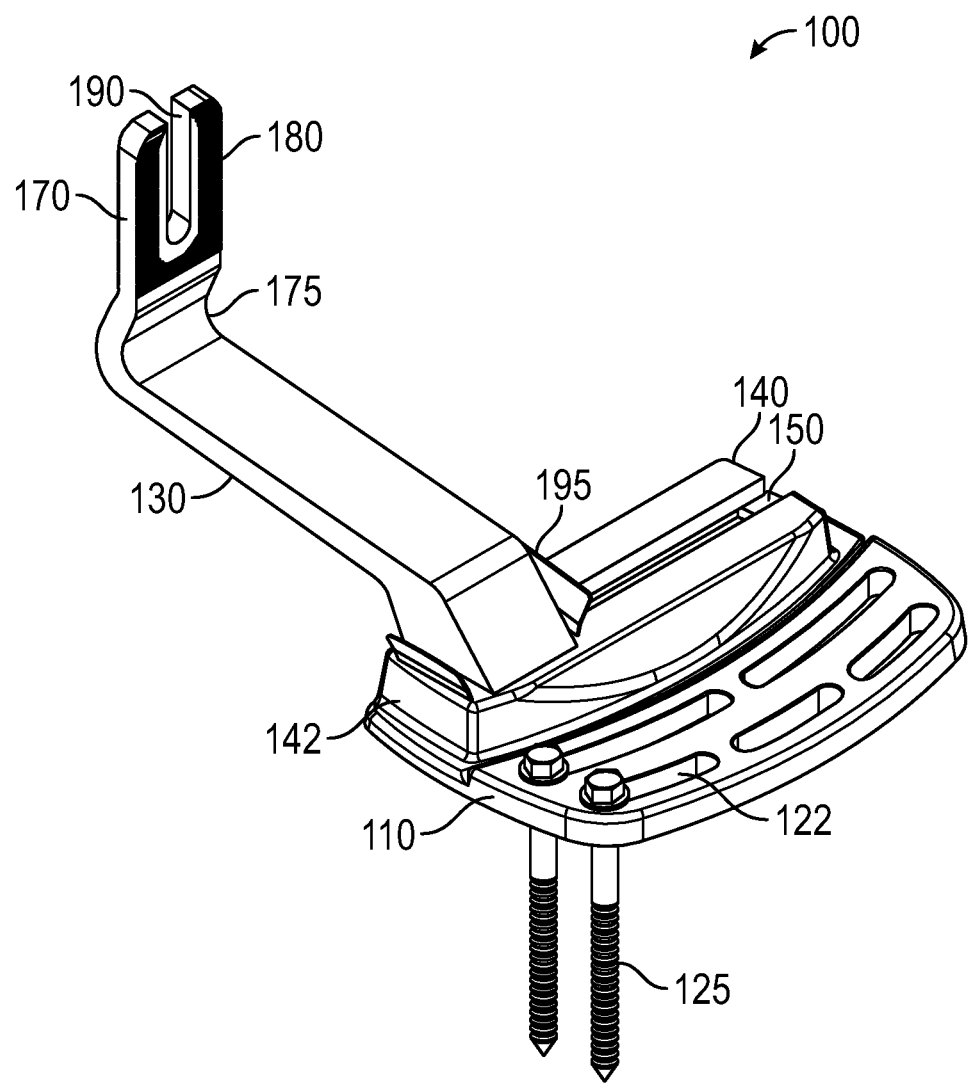
FIG. 17 illustrates a perspective view of an alternate exemplary embodiment of the invention with a modified guide and slots for securing the base to the roof.
Figure 18:
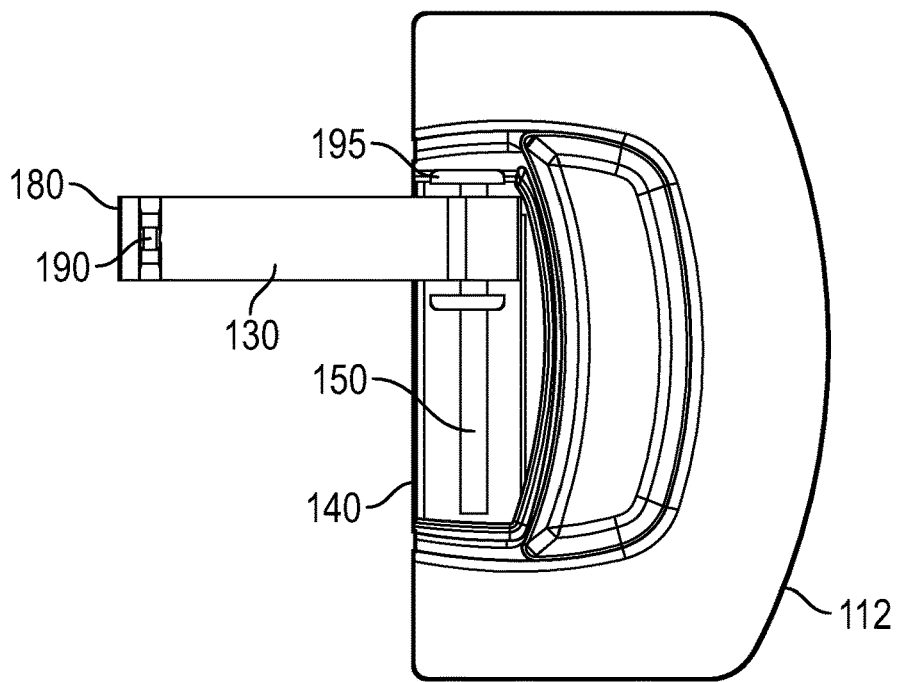
FIG. 18 illustrates a top view of the embodiment shown in FIG. 17 with a flashing covering the base.
Figure 19:
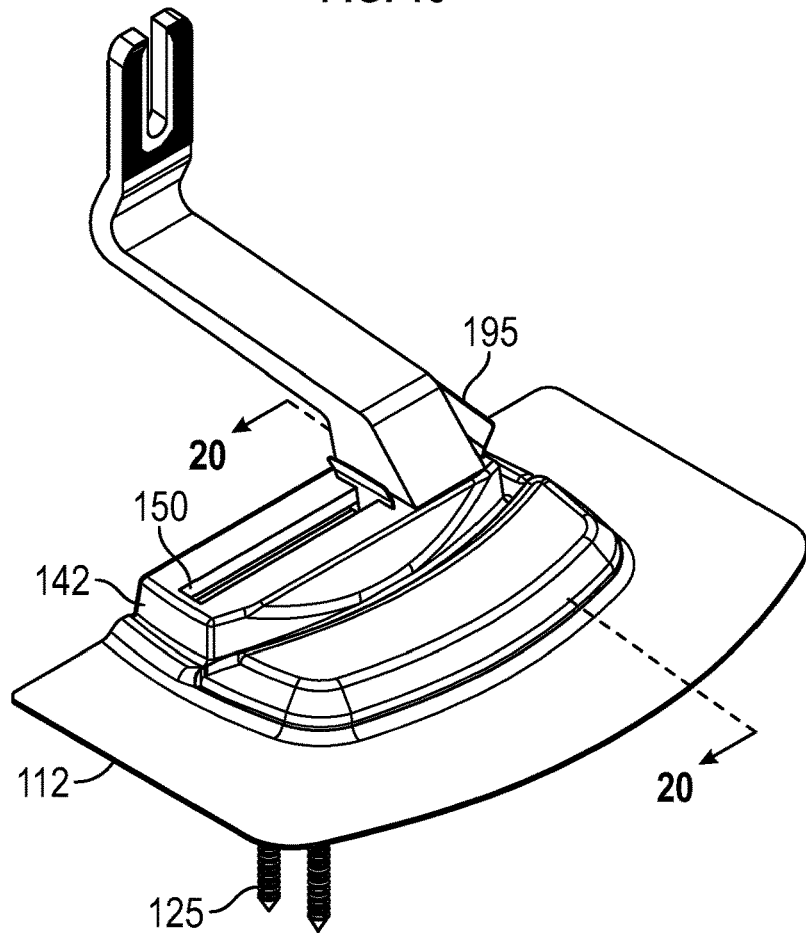
FIG. 19 illustrates a perspective view of FIG. 18.

FIG. 17 shows an alternate exemplary embodiment of the solar panel structure 100. In this embodiment, the base plate 110 can be positioned in various locations with elongated holes 122 and secured with the screws 125. The slot guide 150 is also bounded by wall 142 on one end of the rails 140. The wall 142 prevents the bracket 130 from escaping one end of the guide 150. FIGS. 18-19 show top and perspective views respectively of the embodiment in FIG. 17 with a flashing cover 112 that envelops the base plate 110 to provide further protection from the elements.

Figure 20:
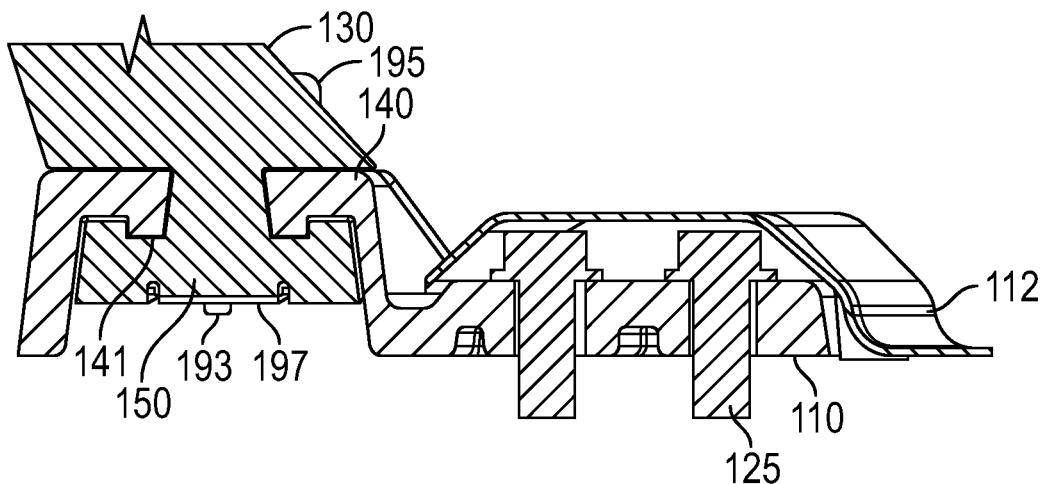
FIG. 20 illustrates a cross-sectional view along the slice shown in FIG. 19.
Figure 21:
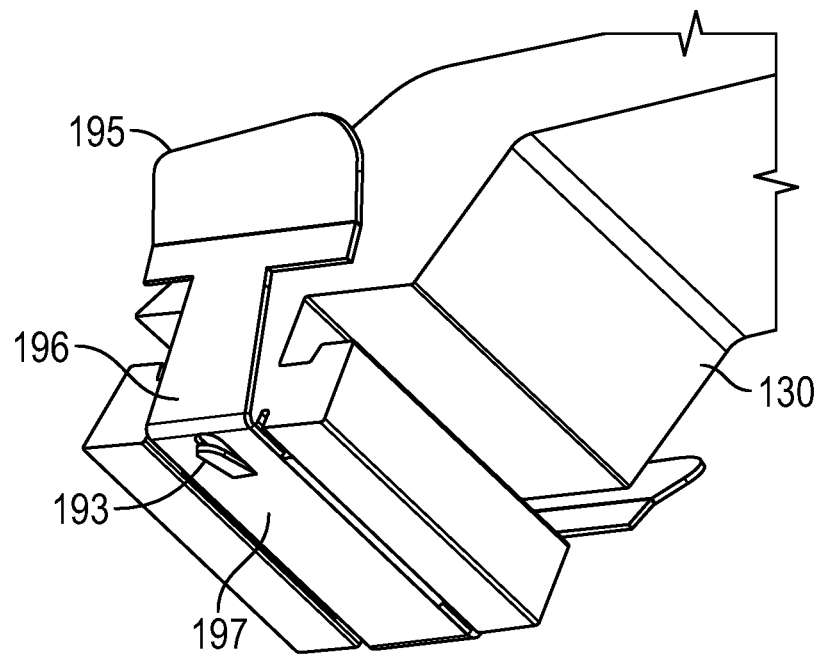
FIG. 21 illustrates a bottom perspective view of the spring lock mechanism on the elongated member.
Figure 22:
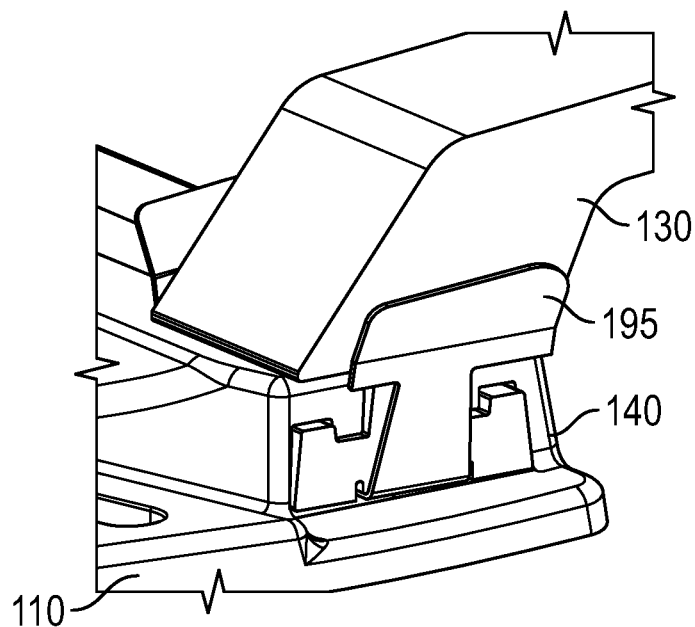
FIG. 22 illustrates a perspective close-up view of the spring lock mechanism of FIG. 21.
Figure 23:
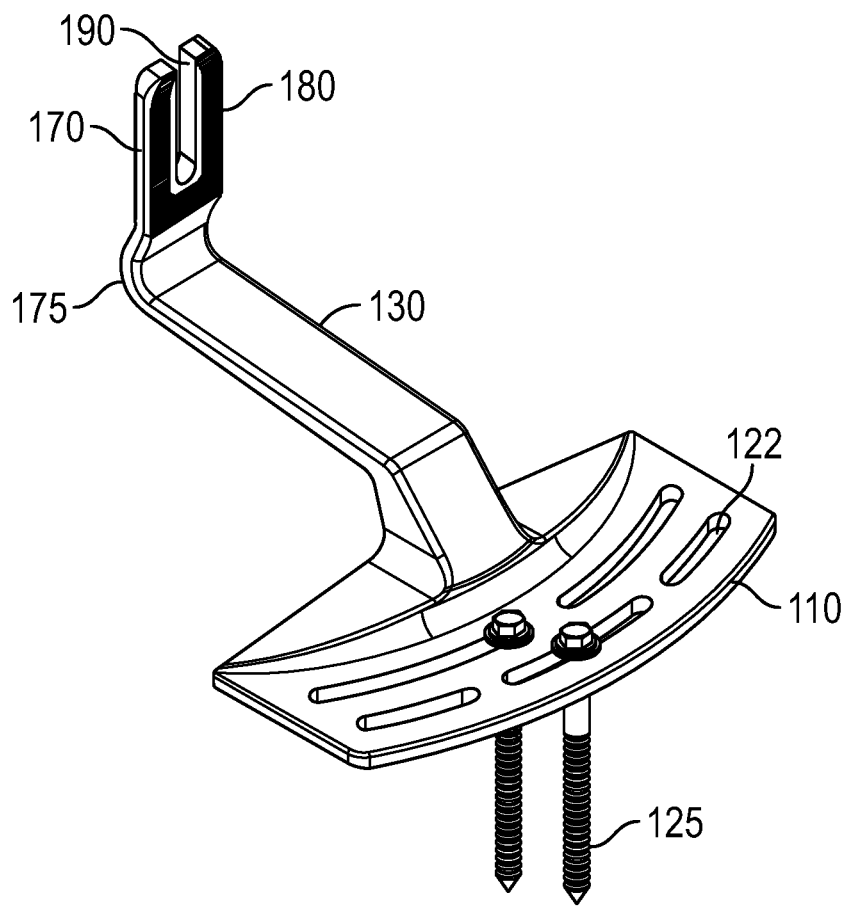
FIG. 23 illustrates a perspective view of another exemplary embodiment of the apparatus that utilizes a elongated member that is stationary in the middle of the base.
Figure 24:
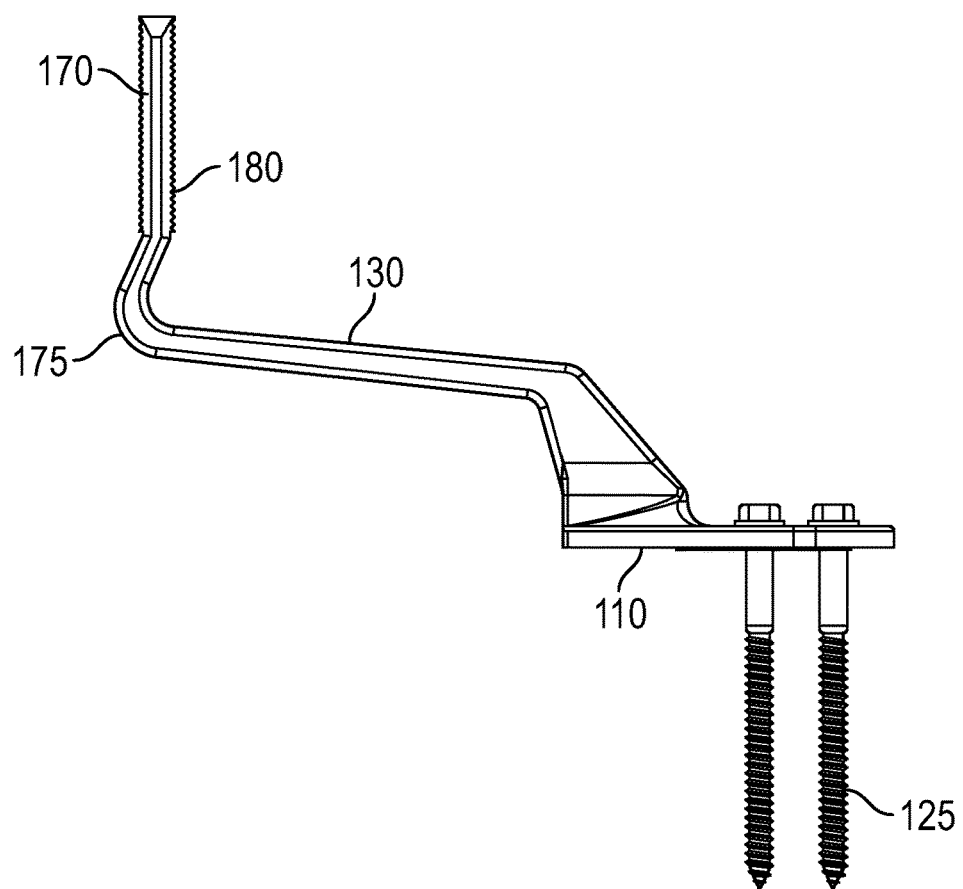
FIG. 24 illustrates a side view of the embodiment shown in FIG. 23.
Figure 25:
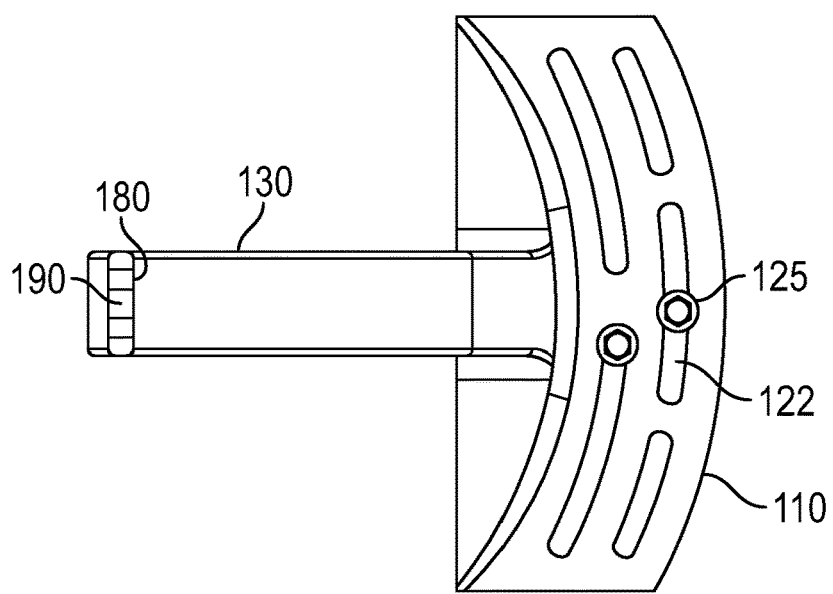
FIG. 25 illustrates a top view of the embodiment shown in FIG. 23.
Figure 26:
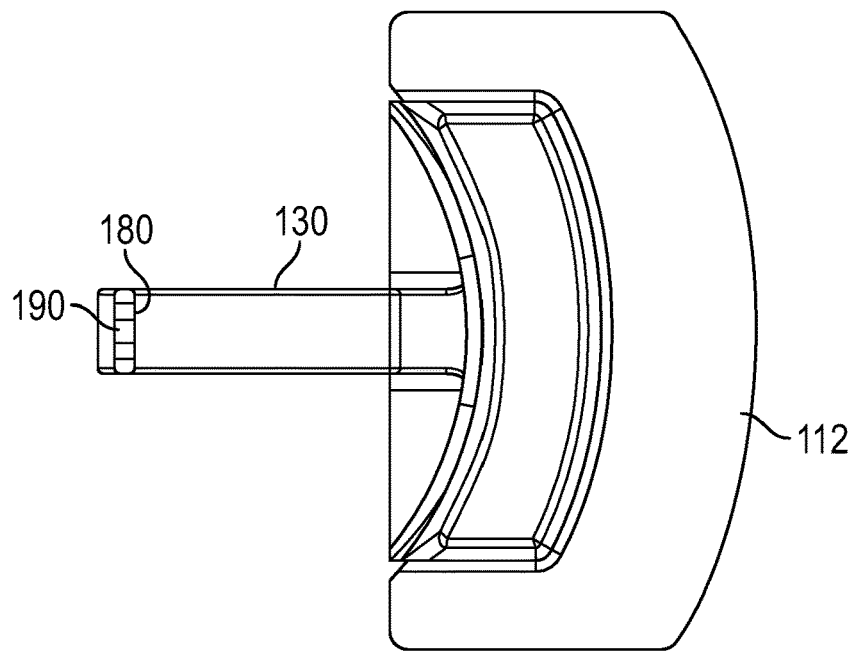
FIG. 26 illustrates a top view of the embodiment shown in FIG. 23 with a flashing covering the base.
Figure 27:
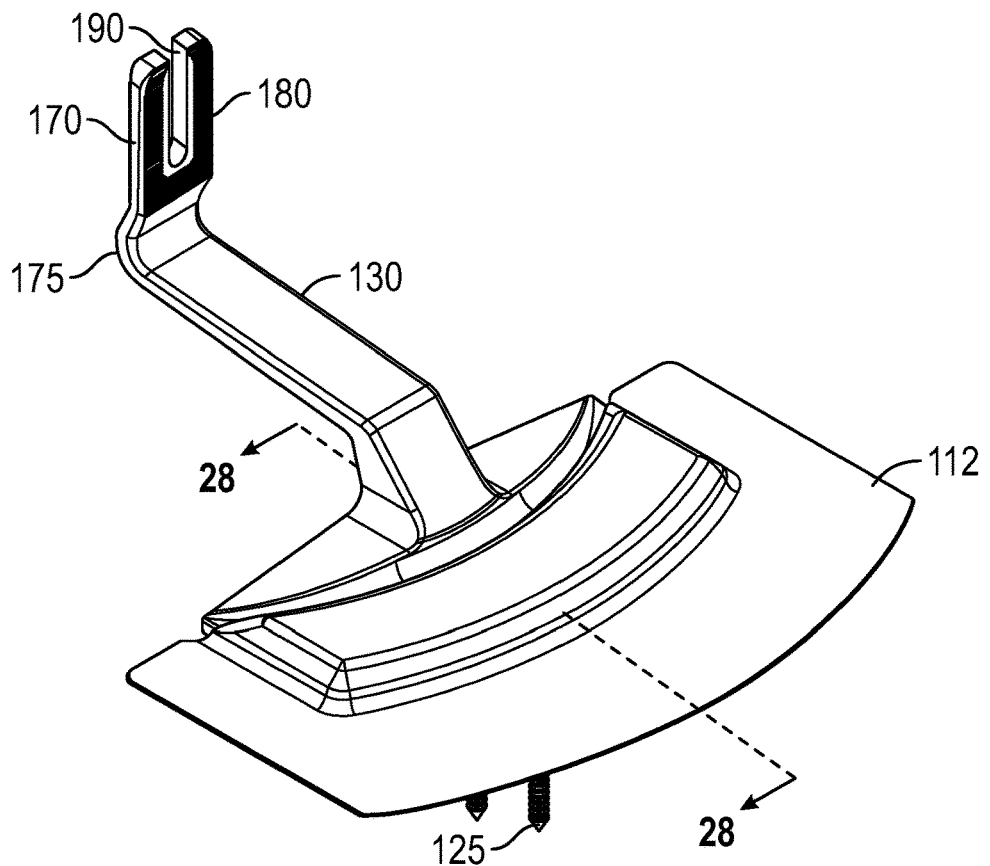
FIG. 27 illustrates a perspective view of FIG. 26.

FIG. 20 illustrates a cross-section along the dashed line 20 in FIG. 19. This illustration shows greater details of how the locking mechanism 196 interacts with the slot guide 150 and the rails 140. As can be seen, the rails 140 include opposing downward flanges 141 whereby the contour of the slot guide 150 is filled by the locking mechanism 196. Bottom tag 193 keeps the bracket 130 from escaping the base plate 110 once the installer has assembled them together. The tabs 195 are joined by a bottom side 197, which includes the tag 193 as shown in detail in the bottom perspective view of FIG. 21 and the perspective view of FIG. 22.

Figure 28:
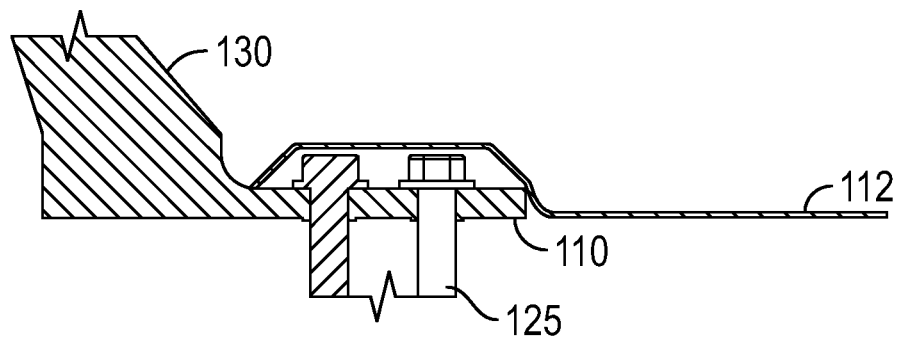
FIG. 28 illustrates a cross-sectional view along the slice shown in FIG. 27.

FIGS. 23-27 show another exemplary embodiment of the solar panel support structure 100. In this embodiment, the bracket 130 and the base plate 110 are formed as one piece that utilizes the elongated holes 122 shown in the embodiment illustrated in FIG. 17. The bracket 130 is typically secured in the middle of the base plate 110. FIG. 28 shows a cross-sectional view along the 28 line in FIG. 27.

Figure 29:
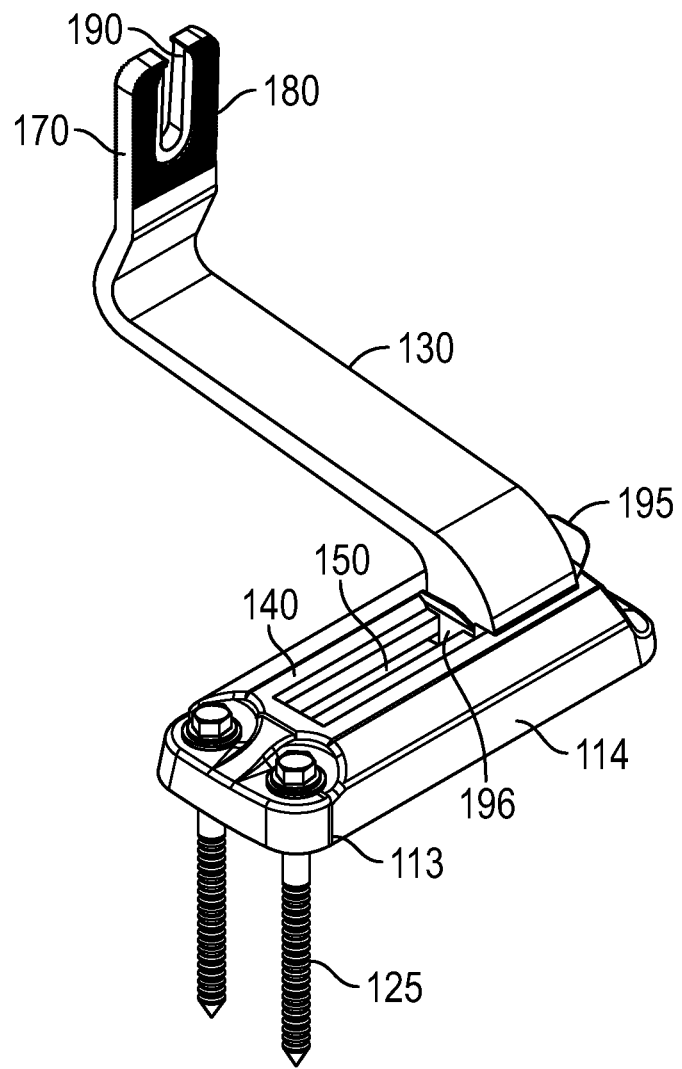
FIG. 29 is a perspective view of the embodiment shown in FIG. 30.
Figure 30:
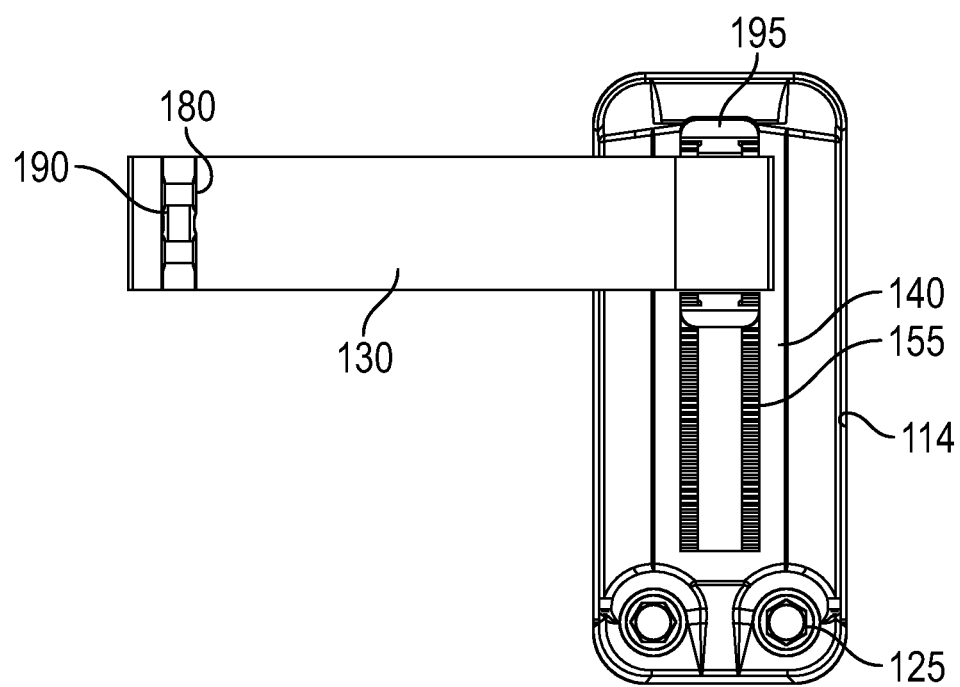
FIG. 30 is a top view of the embodiment shown in FIG. 29.
Figure 31:
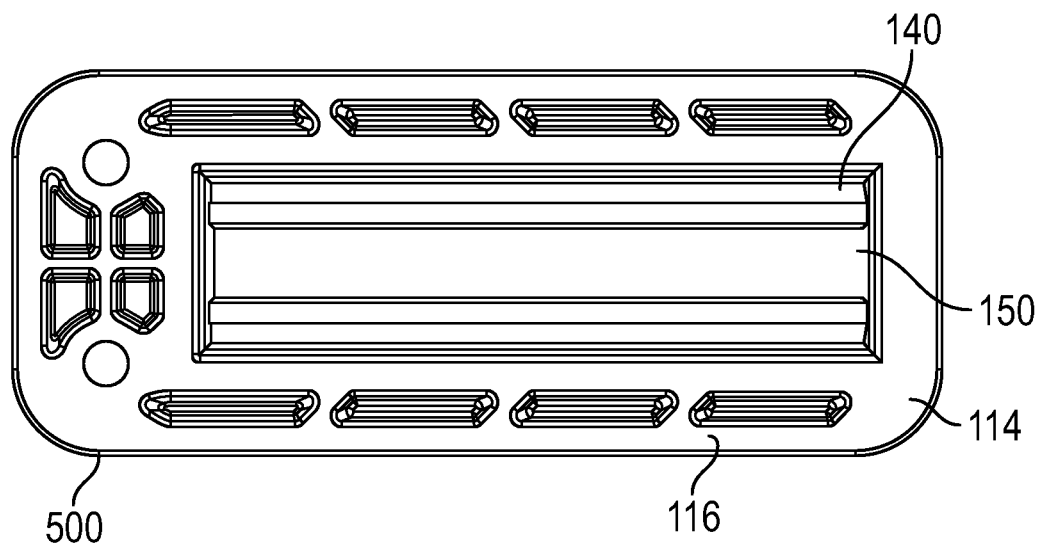
FIG. 31 is a bottom view of the base of the embodiment shown in FIG. 30.
Figure 32:
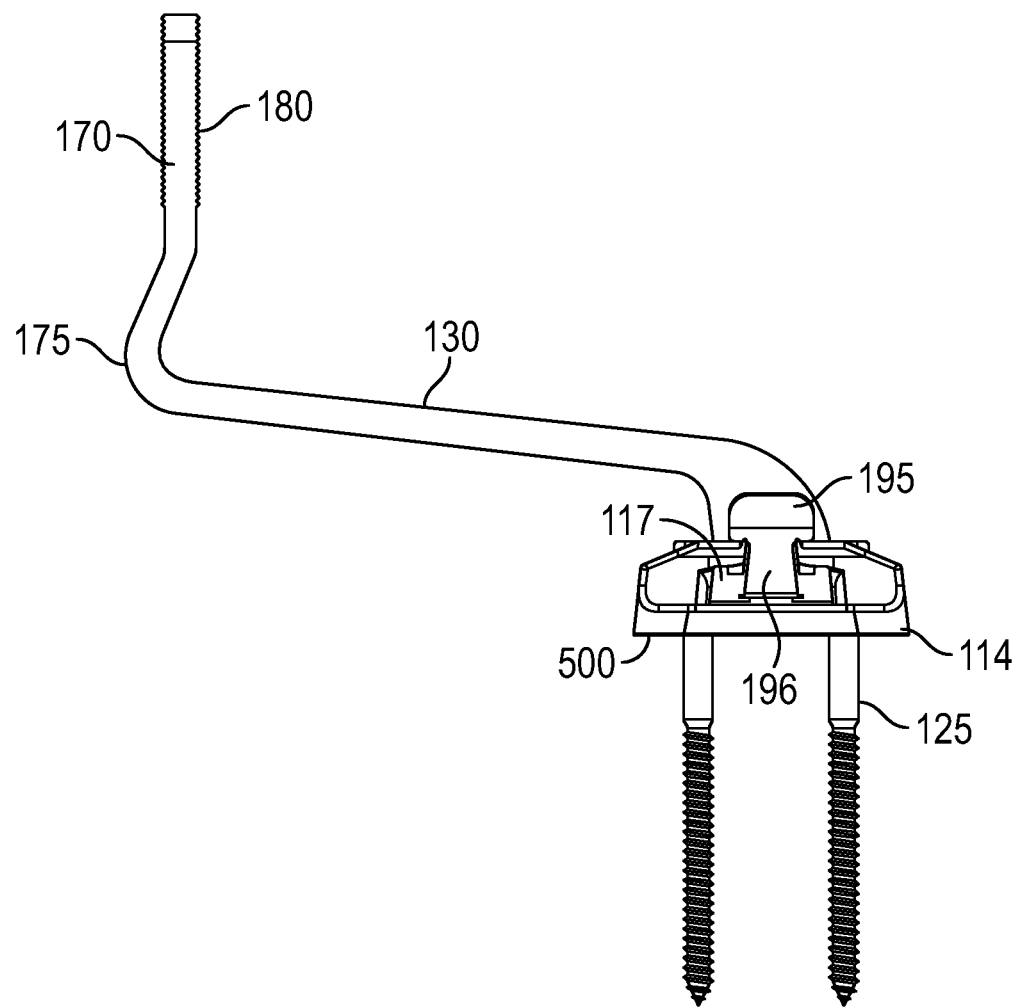
FIG. 32 illustrates a side view of another exemplary embodiment of the apparatus that utilizes a spring lock mechanism for the elongated member and a modified base and guide.
Figure 33:
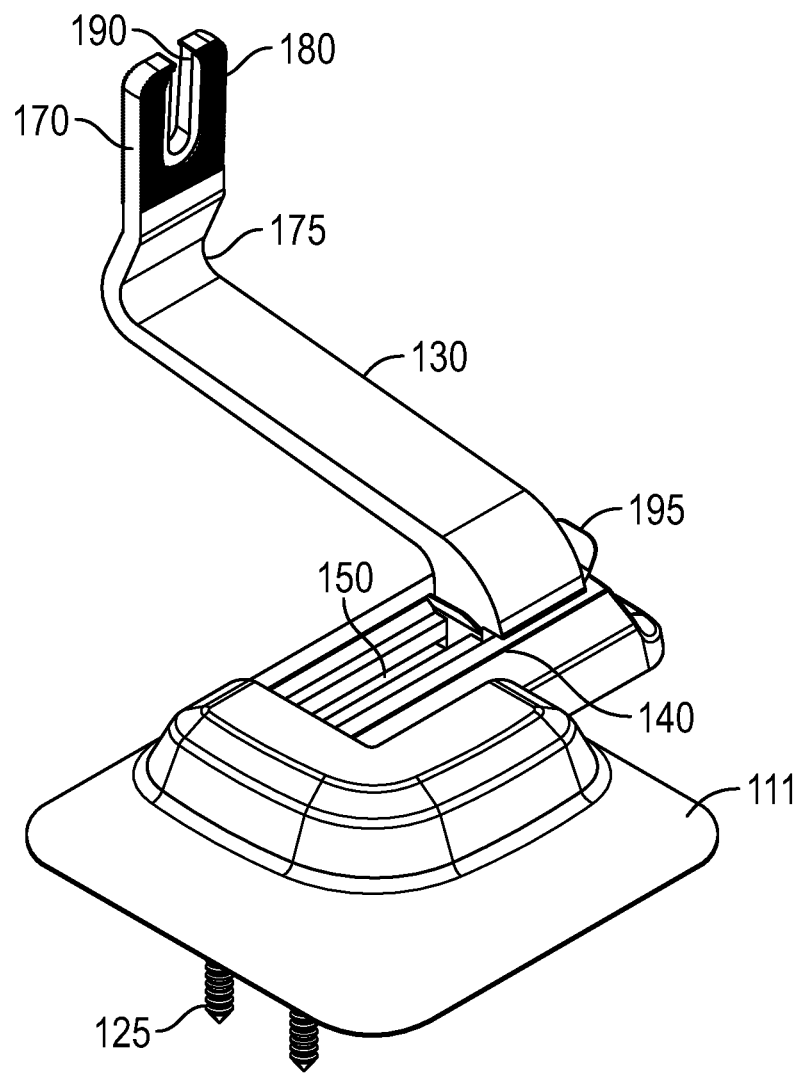
FIG. 33 is a perspective view of the embodiment shown in FIG. 30 with a partial flashing covering the base and roof penetrations of the embodiment shown in FIG. 30.
Figure 34:
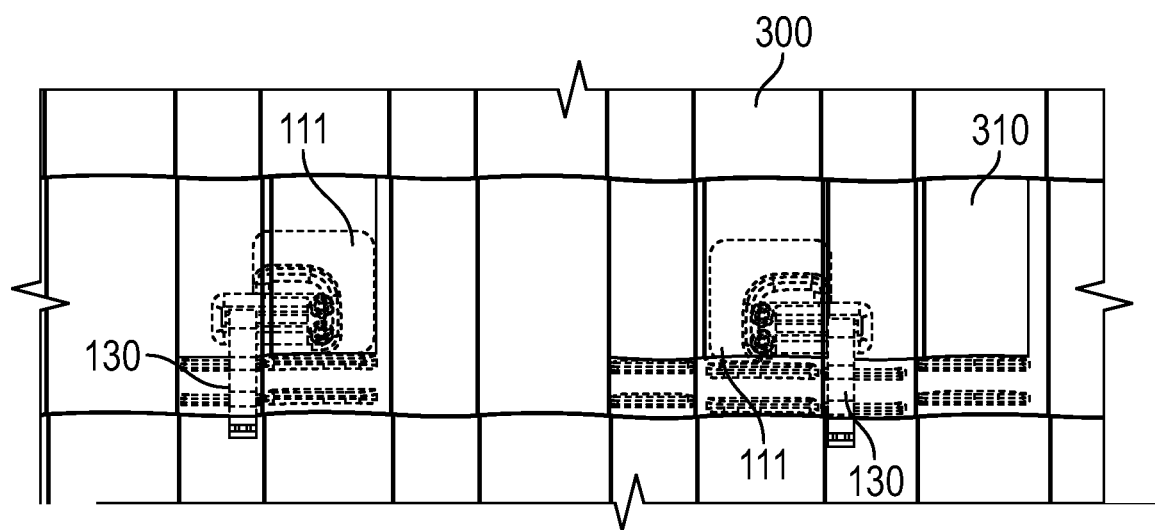
FIG. 34 is a top transparent view of the embodiment shown in FIG. 30 further illustrating that the embodiment can be installed in multiple positions.
Figure 35:
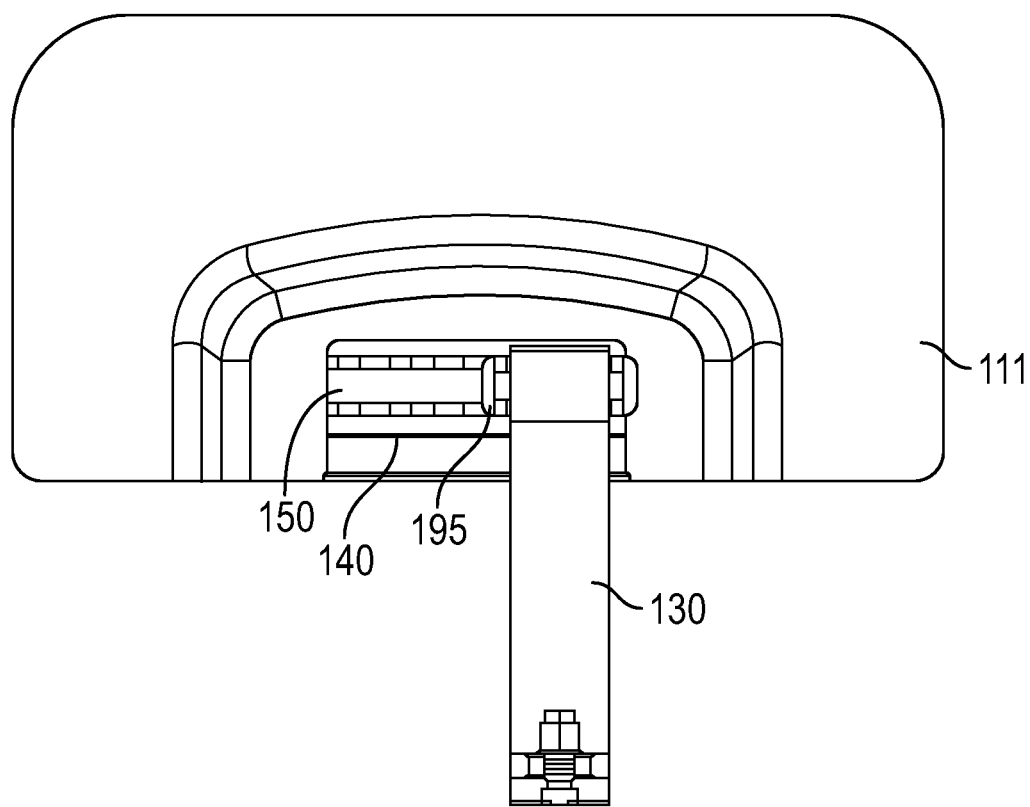
FIG. 35 is a top view of the embodiment shown in FIG. 30 with a full flashing covering the base.
Figure 36:
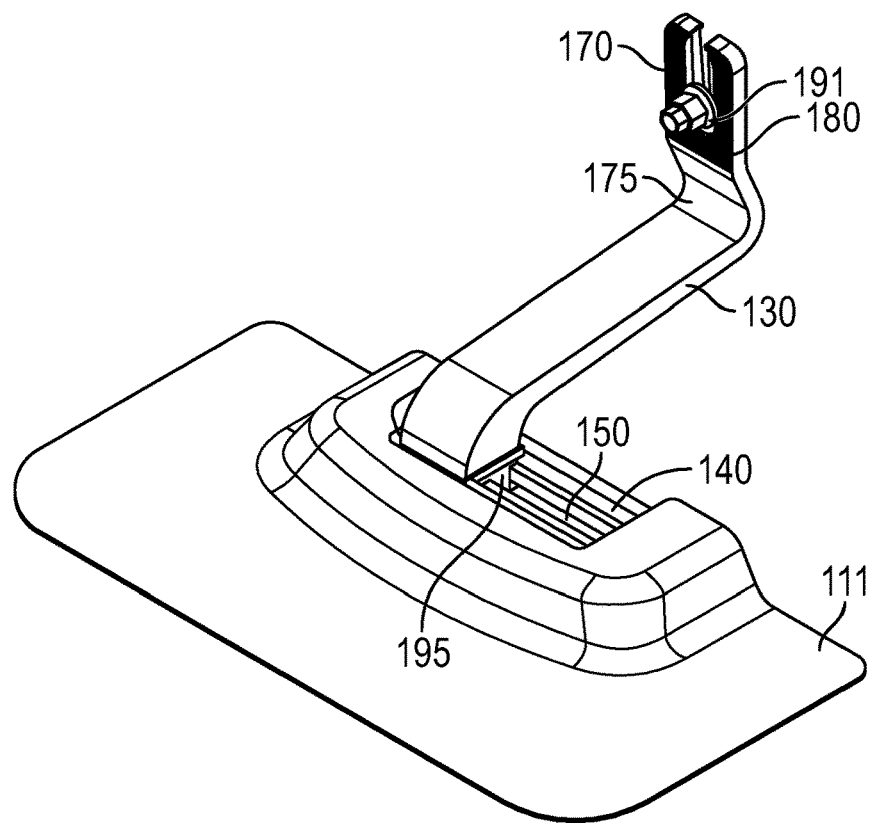
FIG. 36 is a perspective view of the embodiment shown in FIG. 35.

FIGS. 29-32 show another exemplary embodiment of the solar panel support structure 100. FIG. 29 shows a perspective view of the structure 100 that includes a base plate 114 with a narrower profile of the plate 110 shown in previous embodiments. In this embodiment, the holes 113 where screws 125 fit to secure the plate 114 to a roof are collinear with the rails 140 and the guide 150 for structural performance. This allows the base plate 114 to be secured to the roof from either side i.e. it is reversible. The reversibility allows greater flexibility to position the base plate 114 beneath the tiles during installation as will be shown below. The guide 150 is also closed on one end to limit the lateral movement of the bracket 130 and the locking mechanism 196 when the tabs 195 are in the unlocked position. Guide 150 can also include teeth 155 that can be used for providing resistance to the locking mechanism 196. FIG. 30 shows a top view and FIG. 32 shows a front view of the support structure 100. FIG. 31 shows a bottom view of the structure 100 with a crease 500 around the perimeter to prevent slipping when the base plate 114 is secured to the roof. FIG. 33 shows the embodiment in FIGS. 29-32 with a reversible partial flashing 111 that encloses a portion of the base plate 114, but leaves the bracket free to move laterally within the entire slot guide 150, minimizes the flashing size, and covers the roof penetration points. FIGS. 35 and 36 show top and perspective views of the embodiment shown in FIGS. 29-32 with a full-sized version of flashing 111. These figures also show the nut and bolt combination 191 that is used to secure a solar panel rail guide 350 to the bracket 130.

Figure 37:
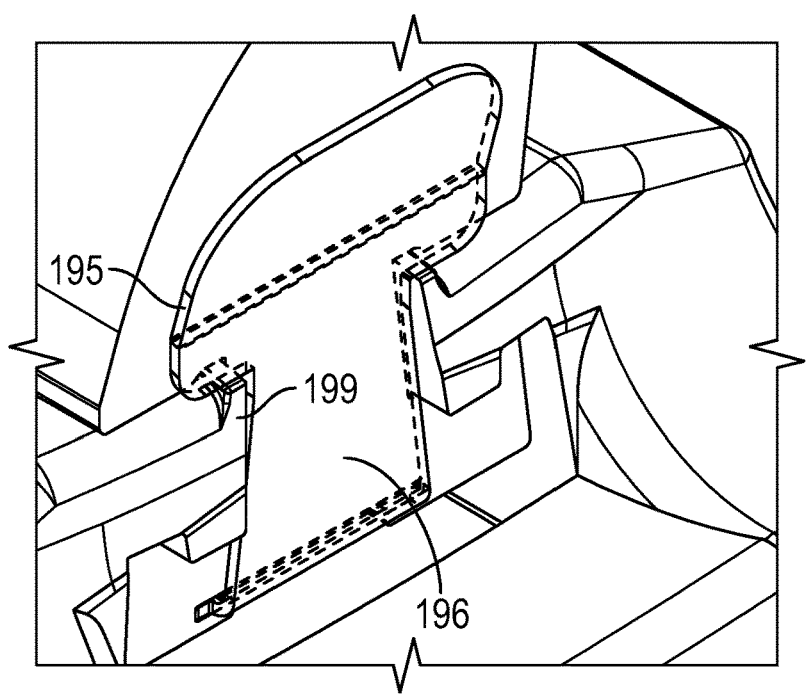
FIG. 37 is a close-up view of the spring lock mechanism in the unlocked position (actuated) going over a locking bump on the base.
Figure 38:
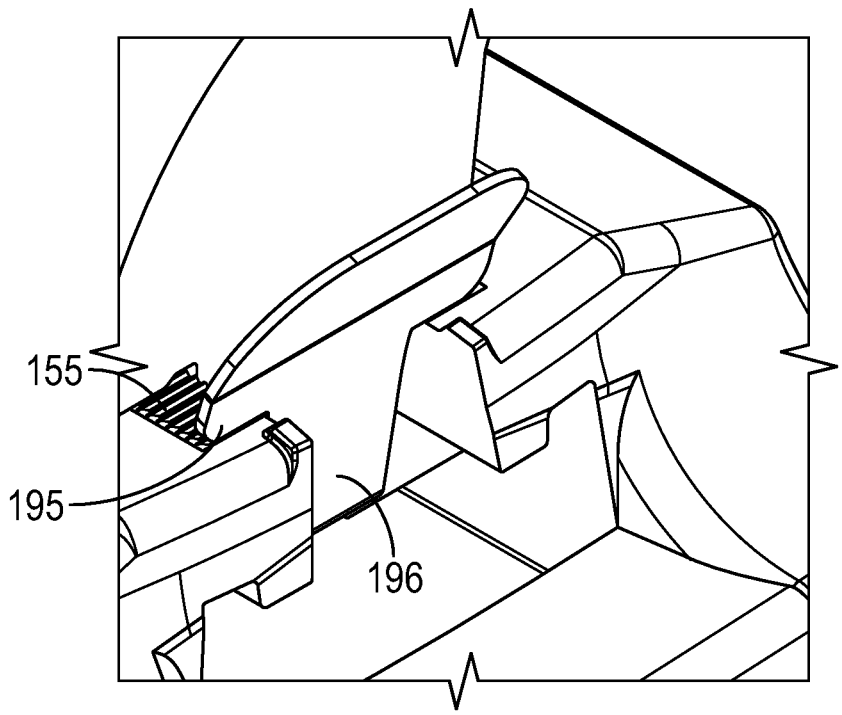
FIG. 38 is a close-up of the spring lock mechanism shown in FIG. 37 in the locked position (default).
Figure 39:
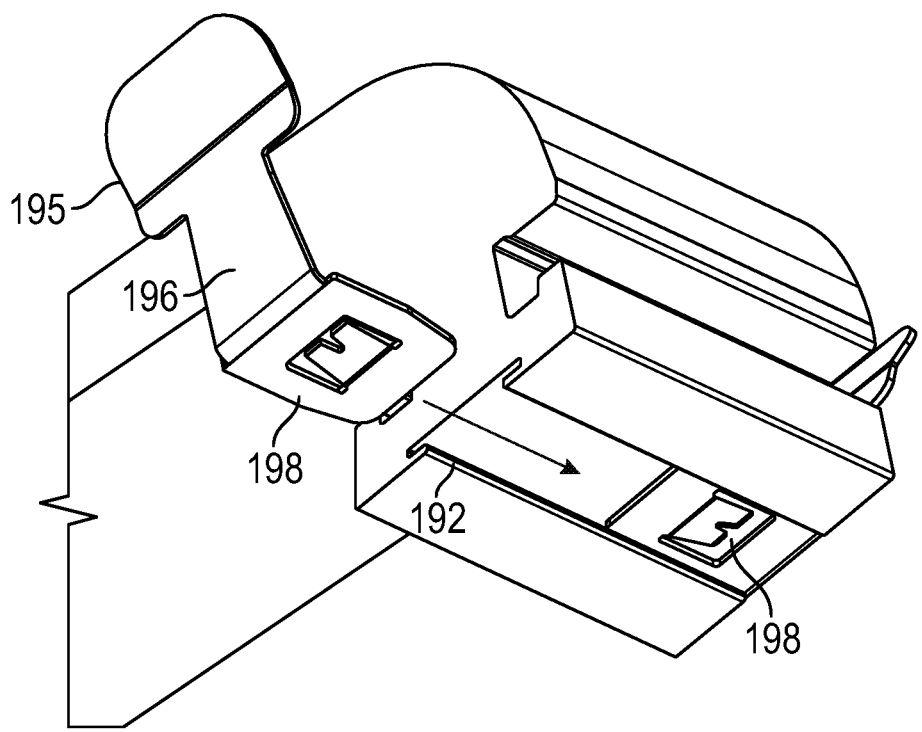
FIG. 39 is a bottom perspective view of an alternate embodiment of the spring lock mechanism unassembled on the elongated member.

FIGS. 37-39 disclose an alternate exemplary embodiment of the spring lock mechanism 196 and how it is locked in place in the alternate embodiment disclosed in FIGS. 29-32. FIG. 37 shows the bracket 130 and the resilient tabs 195 slide over a notch 199 on the base plate 114 when the spring lock 196 is fully unlocked by actuating (squeezing) the tabs 195, which places it in an open position. This notch 199 serves to hold the bracket 130 to the base once the installer has assembled them together and eliminates accidental removal while the installer is adjusting the placement of the bracket 130. FIG. 38 shows the tabs 195 in the locked position after being released, which locks the bracket to the base in a closed position while the installer is adjusting the position of the rail guide (350). FIG. 39 shows an alternate exemplary embodiment of the tabs 195 as separate elements. These tabs 195 are inserted and slide through thin slot 192 where notches 198 lock their placement in the bracket.

Another exemplary embodiment is shown in FIGS. 8-11. In this embodiment, the base plate 110 comprises an angled guide 150 with rails 140. The bracket 130 is adjustable on the end that is inserted into the angled guide 150 by finding a desired lateral location along the angled guide 150 and then locating the desired vertical location of the end of the bracket 130 along ridges 400, which are on the rails 140. A nut 166 and bolt 165 combination 165 can then be used to tighten the bracket 130 to the angled guide 150.

Figure 1:
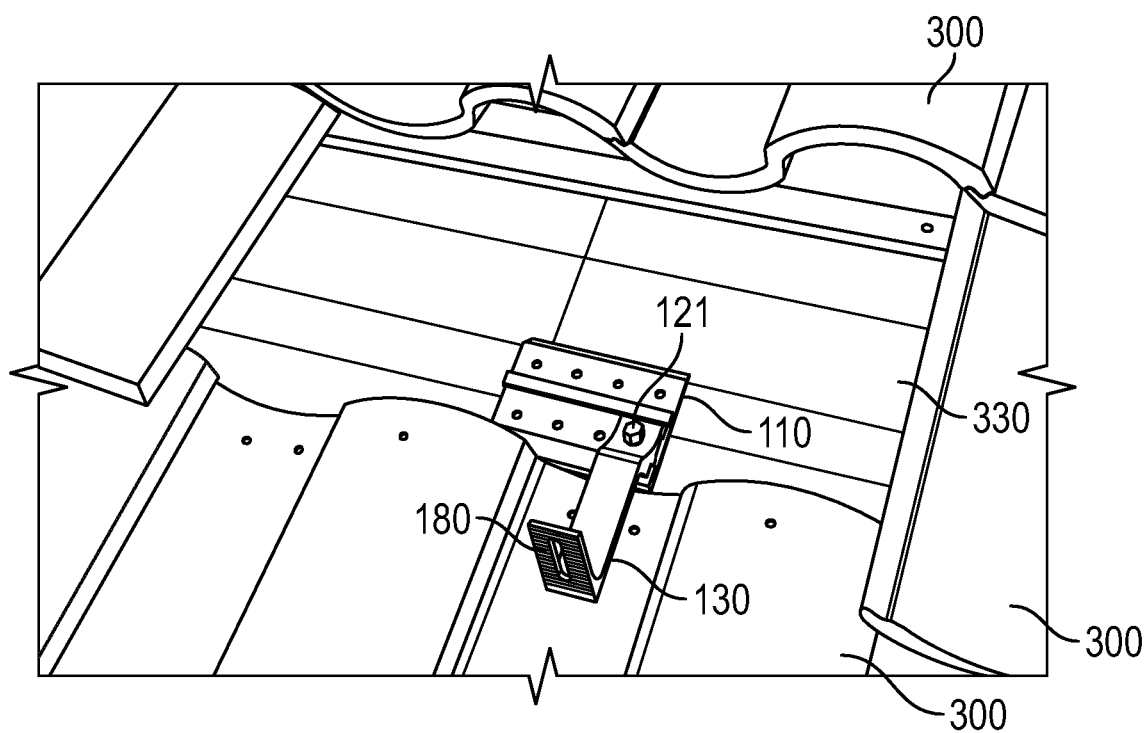
FIG. 1 illustrates a top view of the tiled roof with a sample of tiles removed and an apparatus prior to being secured to the roof.

A method of assembling a prior art structure 100 is shown in FIGS. 1-7. The assembly method can apply to any of the structure embodiments described and illustrated the previous paragraphs. FIG. 1 shows that the first step is to remove any tiles 300 in the area where the structure 100 is to be installed. The tiles 300 shown are S-shaped concrete tiles, but other shapes such as flat tiles can be used as well. Upon removing the tiles 300, the roof 330 is revealed. The base plate 110 of the structure 100 with the bracket 130 secured by inserting bolt 121 through an end of the bracket 130 to the base plate 110 is placed flat on the roof 330. In the exemplary embodiments described herein, this step is replaced by coupling the end of the bracket 130 through the guide 150 by actuating the locking mechanism 196 until the bracket 130 is positioned in a desired location. The base plate 110 is positioned on a rafter and in a location where the length of the bracket 130 extends past the edge of overlapping tiles 300.

Figure 2:
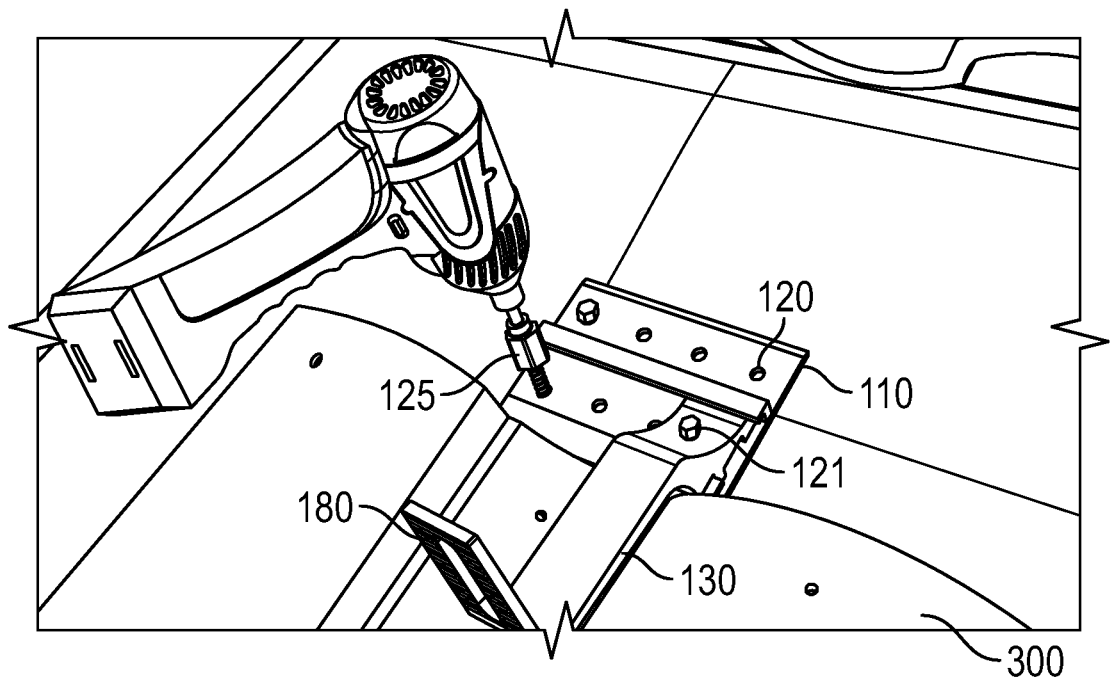
FIG. 2 illustrates the same view shown in FIG. 1 showing the apparatus being secured to the roof.

FIG. 2 shows the next step, which is to secure the base plate 110 to the roof 330. The figure shows this being accomplished by using a standard drill to insert the screws 125 through the holes 120 of the base plate 110.

Figure 3:
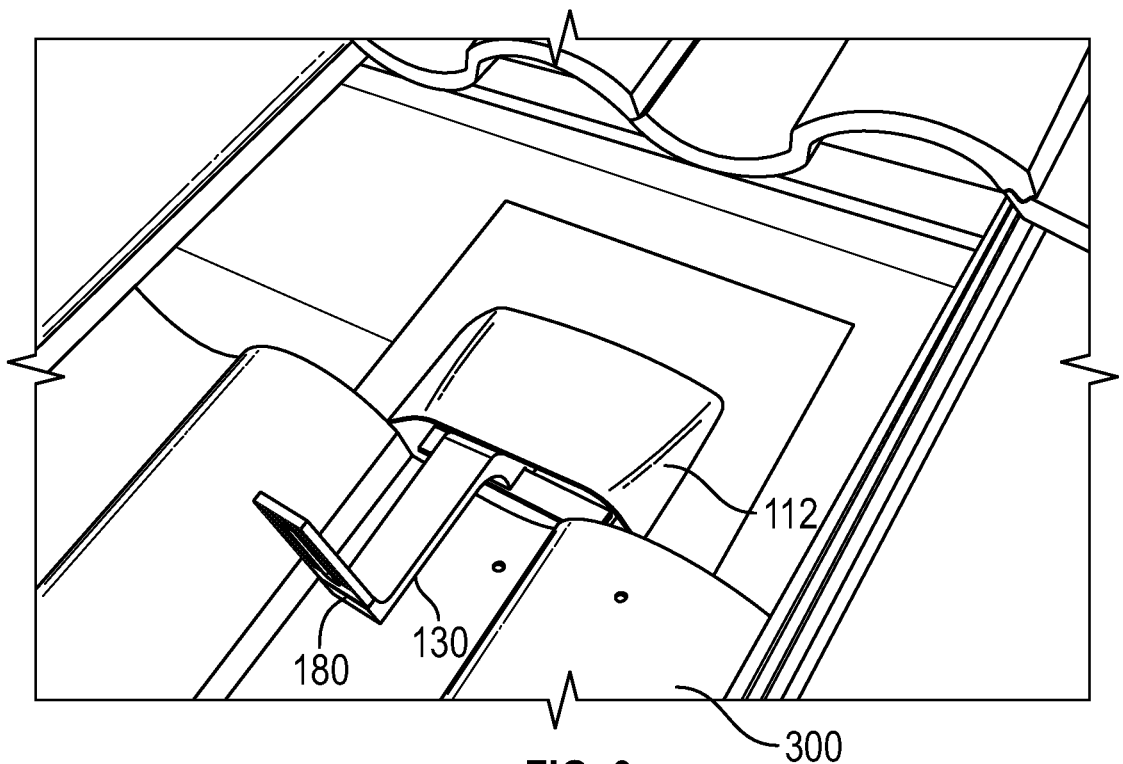
FIG. 3 illustrates the same view shown in FIG. 2 with a flashing over the apparatus.

FIG. 3 includes a step of covering the base plate 110 with a flashing 112. The flashing 112 is optional and typically covers the entire base plate 110 but can also be a partial flashing 111 as shown in FIG. 33.

Figure 4:
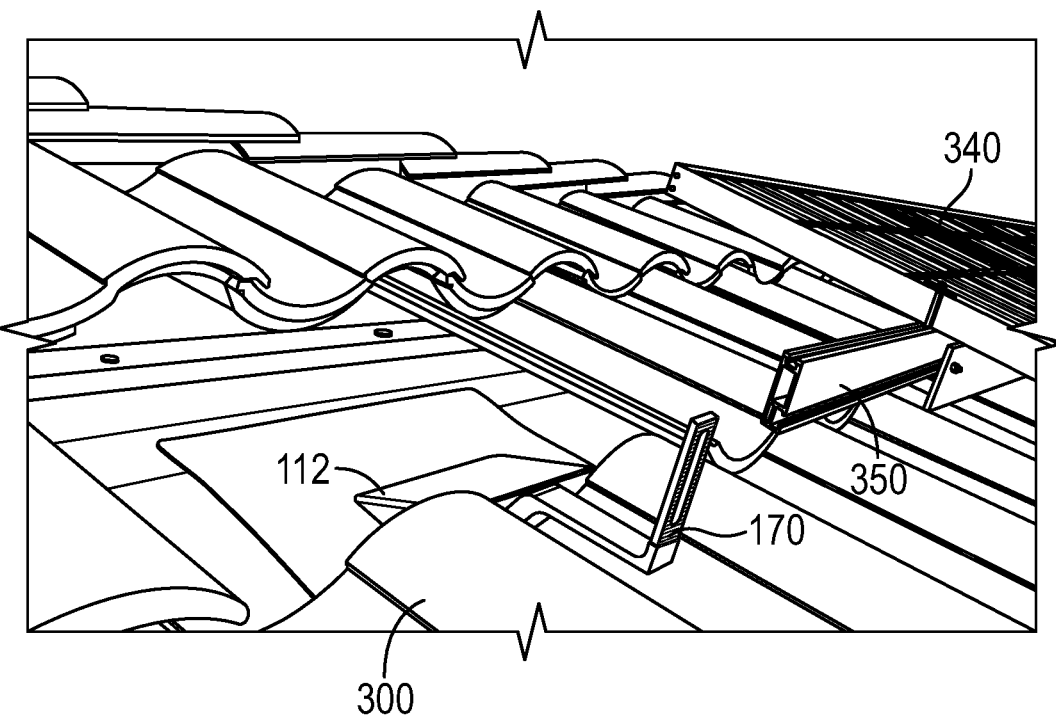
FIG. 4 illustrates a perspective view of FIG. 3.

FIG. 4 is a perspective view the roof showing the rail guide 350 with a solar panel array 340. The rail guide 350 will be connected to the bracket 130 and secured with a nut and bolt through the rail guide 350 and the aperture 170. The grooves 180 will prevent the rail guide 350 from slipping downward.

Figure 5:
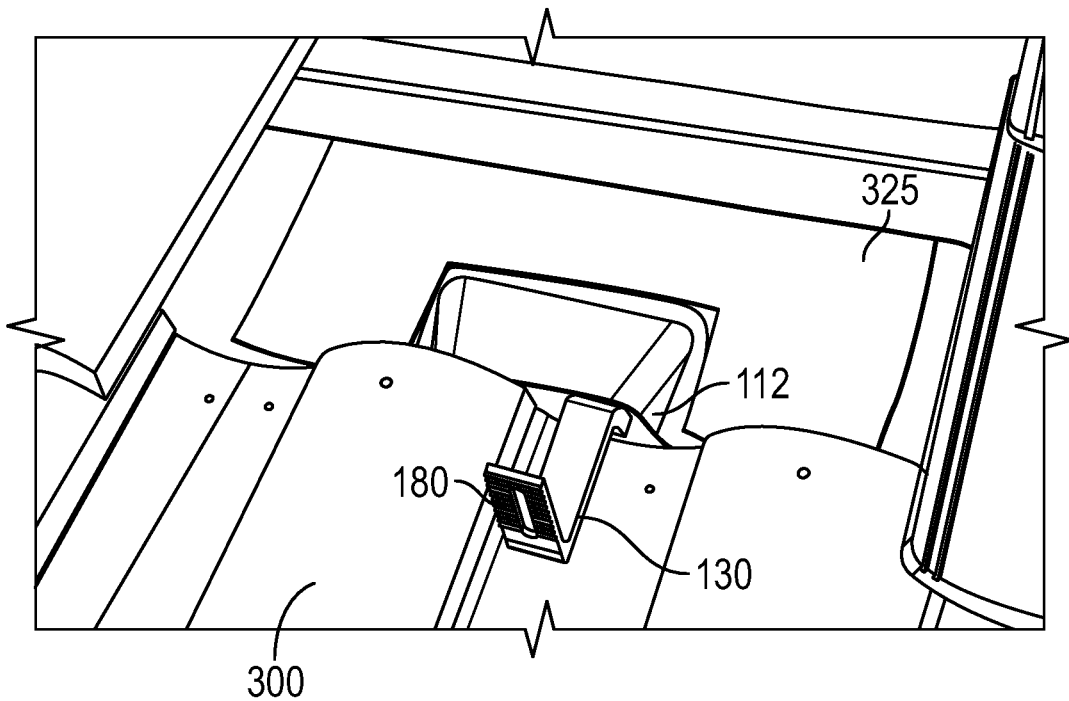
FIG. 5 illustrates the same view shown in FIG. 3 with a flashing sealed to the roof.

FIG. 5 shows another optional step which is to place a water seal 325 over the flashing 112. This will provide more resistance to leaks in the roof 330.

Figure 6:
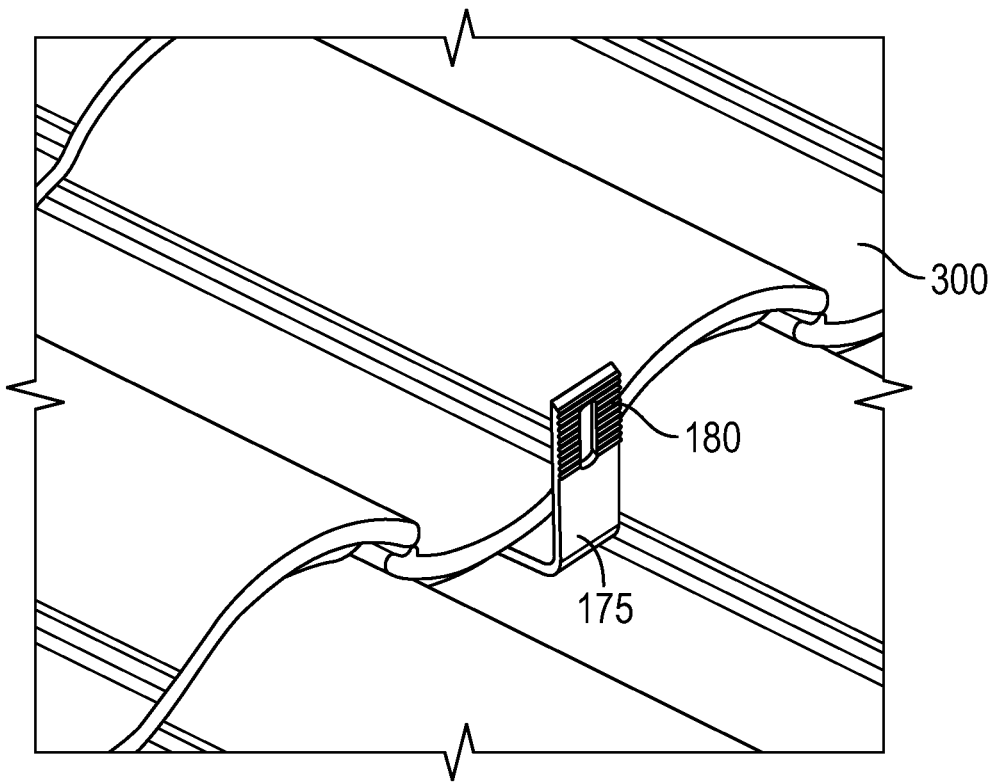
FIG. 6 illustrates a perspective view shown in FIG. 5 with the tiles reinstalled and the elongated member of the apparatus exposed.

FIG. 6 shows the next step, which is to place the tiles 300 back in place. The vertical portion 175 of the bracket 130 is exposed revealing the aperture 170 and the grooves 180. As previously mentioned, the rail guide 350 will be secured to the bracket 130.

Figure 7:
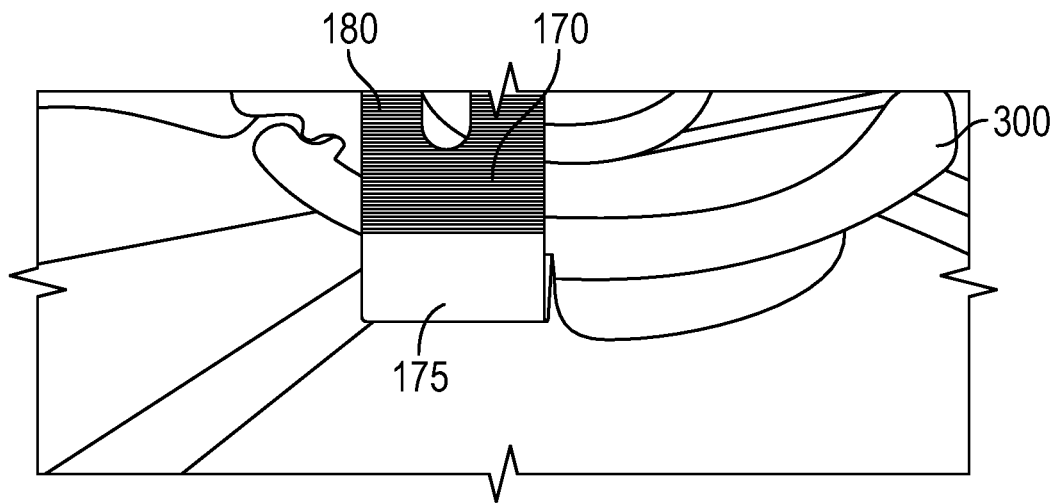
FIG. 7 illustrates a front view shown in FIG. 6.
Figure 8:
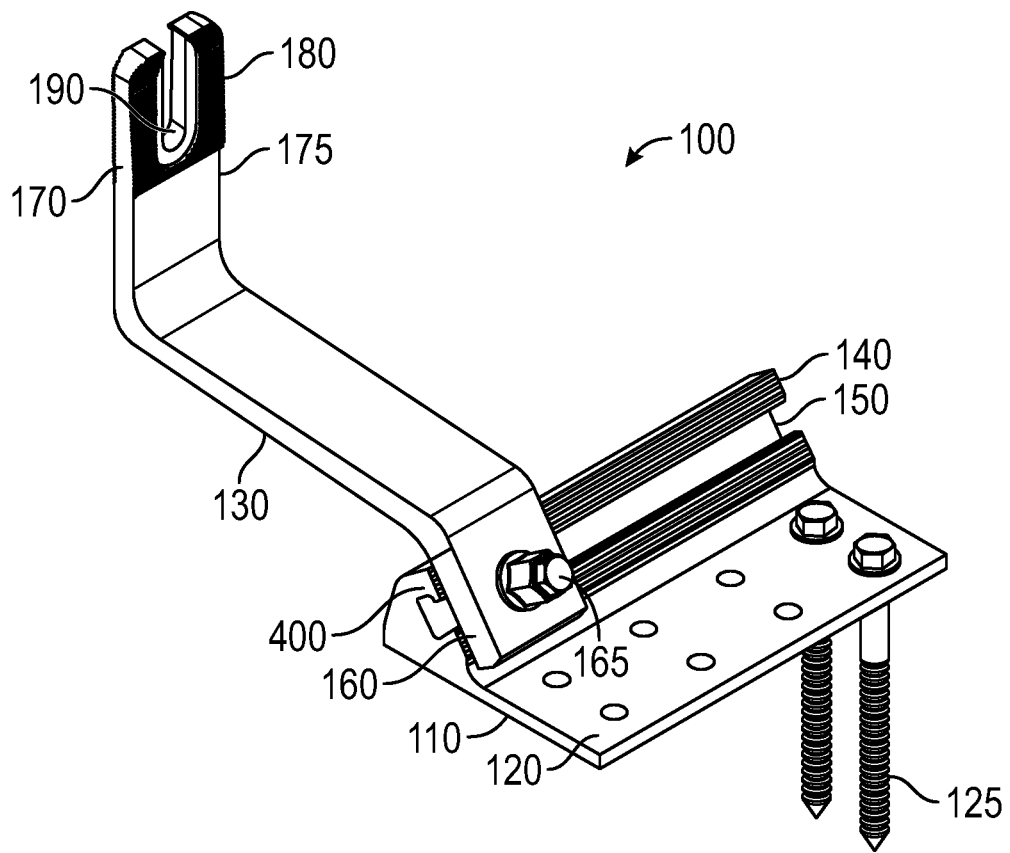
FIG. 8 illustrates a perspective view of an exemplary embodiment of the apparatus that utilizes a nut and bolt to secure the elongated member to the base.
Figure 9:
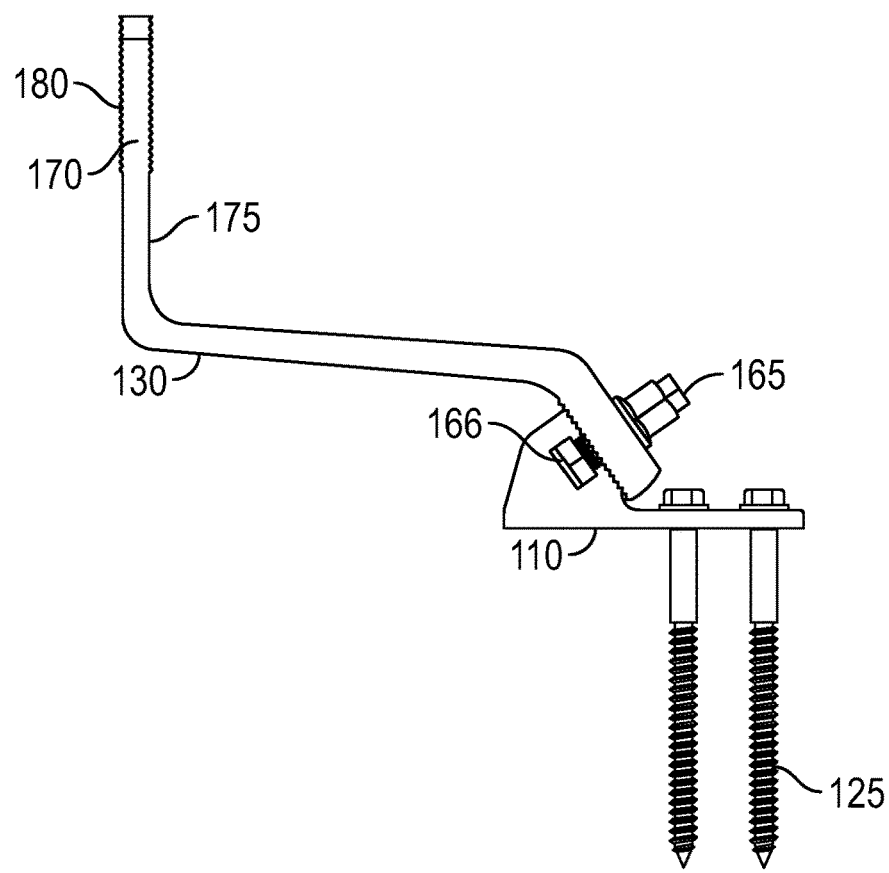
FIG. 9 illustrates a side view the embodiment shown in FIG. 8.
Figure 10:
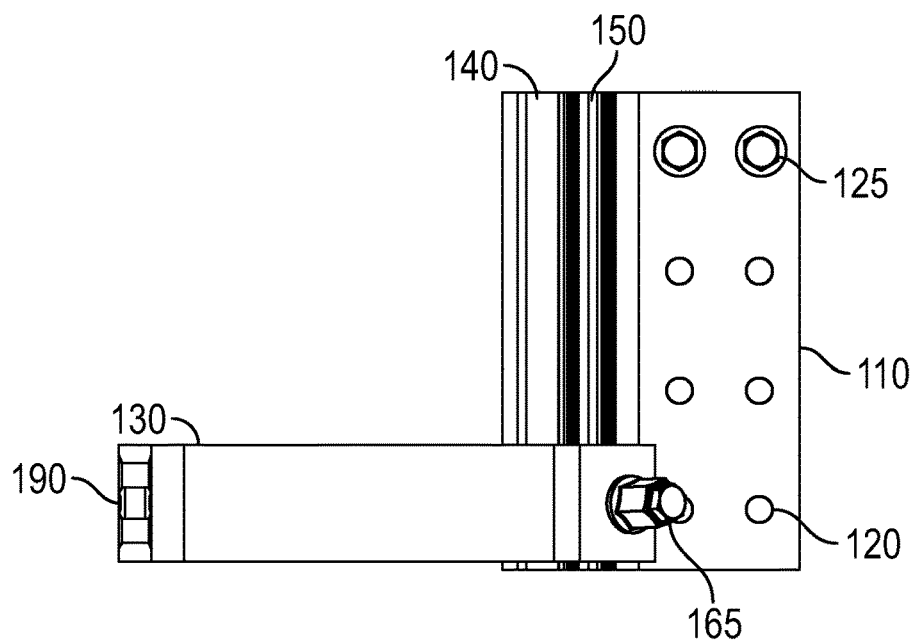
FIG. 10 illustrates a top view of the embodiment shown in FIG. 8.

Finally, FIG. 7 shows a close-up of the vertical portion 175 of the bracket 130 showing the grooves 180 and the aperture 170.

What is claimed is:

1. A mounting assembly for installing a solar panel array to a roof comprising:
 a. a base, the base further comprising:
  i. an elongated guide being elongated along a first axis; and
  ii. a plurality of elongated holes being elongated along a second axis, wherein the second axis is substantially parallel to the first axis;
 b. an elongated member further comprising:
  i. a first end; and
  ii. a second end;
  iii. the first end further comprising an aperture, the aperture further comprises a recessed path around a portion of the aperture that terminates at a lip such that the lip extends outward over the aperture;
  iv. the second end further comprising a locking mechanism
  v. wherein the locking mechanism is coupled to the elongated guide so that the elongated member can move laterally along the elongated guide when in an open position and remain stationary when in a closed position,
  vi. wherein the locking mechanism further comprises at least one tab such that when the tab is actuated, the locking mechanism is in the open position.

2. The mounting assembly of claim 1 wherein the base further comprises a notch such that the notch engages the at least one tab when the at least one tab is in the closed position.

* * * * *